US012732231B2

(12) United States Patent
Prasad et al.

(10) Patent No.: US 12,732,231 B2
(45) Date of Patent: Sep. 8, 2026

(54) RECONFIGURABLE INTELLIGENT SURFACE CALIBRATION

(71) Applicant: QUALCOMM Incorporated, San Diego, CA (US)

(72) Inventors: Narayan Prasad, Westfield, NJ (US); Navid Abedini, Basking Ridge, NJ (US); Tao Luo, San Diego, CA (US); Junyi Li, Fairless Hills, PA (US)

(73) Assignee: QUALCOMM Incorproated, San Diego, CA (US)

( * ) Notice: Subject to any disclaimer, the term of this patent is extended or adjusted under 35 U.S.C. 154(b) by 303 days.

(21) Appl. No.: 18/480,444

(22) Filed: Oct. 3, 2023

(65) Prior Publication Data

US 2025/0112710 A1 Apr. 3, 2025

(51) Int. Cl.

| | |
|---|---|
| ***H04B 7/04*** | (2017.01) |
| ***H04B 17/12*** | (2015.01) |
| ***H04B 17/40*** | (2015.01) |
| ***H04W 24/08*** | (2009.01) |
| ***H04W 24/10*** | (2009.01) |
| ***H04W 84/02*** | (2009.01) |
| ***H04W 88/02*** | (2009.01) |
| ***H04W 88/08*** | (2009.01) |
| ***H04W 88/12*** | (2009.01) |
| ***H04W 88/18*** | (2009.01) |
| ***H04W 92/02*** | (2009.01) |
| ***H04W 92/10*** | (2009.01) |
| ***H04W 92/12*** | (2009.01) |

(52) U.S. Cl.

CPC ..... *H04B 7/04013* (2023.05); *H04B 7/04026* (2023.05); *H04B 17/12* (2015.01); *H04B 17/40* (2015.01); *H04W 24/08* (2013.01); *H04W 24/10* (2013.01); *H04W 84/02* (2013.01); *H04W 88/02* (2013.01); *H04W 88/08* (2013.01); *H04W 88/12* (2013.01); *H04W 88/18* (2013.01); *H04W 92/02* (2013.01); *H04W 92/10* (2013.01); *H04W 92/12* (2013.01)

(58) Field of Classification Search

CPC ... H04B 7/02–17; H04B 17/0082–409; H04W 4/30–70; H04W 8/22–245; H04W 24/02–10; H04W 36/0005–385; H04W 40/005–38; H04W 72/02–569; H04W 84/005–22; H04W 88/005–188; H04W 92/02–24

See application file for complete search history.

(56) References Cited

U.S. PATENT DOCUMENTS

| | | | | |
|---|---|---|---|---|
| 2024/0243781 A1* | 7/2024 | Lee | .................... | H04B 7/04026 |
| 2025/0150119 A1* | 5/2025 | Lee | .................... | H04B 7/04026 |
| 2025/0158665 A1* | 5/2025 | Prasad | .............. | H04B 7/04026 |

* cited by examiner

*Primary Examiner* — Timothy J Weidner

(74) *Attorney, Agent, or Firm* — Harrity & Harrity, LLP

(57) ABSTRACT

Various aspects of the present disclosure generally relate to wireless communication. In some aspects, a network node may transmit, to a reconfigurable intelligent surface (RIS) controller associated with an RIS, a configuration for applying an RIS pattern. The network node may receive, from a network element, a measurement report indicating received observations of pilot signals reflected by the RIS in accordance with the RIS pattern. The network node may transmit, to the RIS controller and based at least in part on the measurement report, an indication of one or more of an updated codebook or a phase drift associated with a calibration of the RIS. Numerous other aspects are described.

22 Claims, 21 Drawing Sheets

500

700

900

900

900

900

1000

1000

1000

1000

1100

1102:

1104:

1106:

1200

1300

RECONFIGURABLE INTELLIGENT SURFACE CALIBRATION

FIELD OF THE DISCLOSURE

Aspects of the present disclosure generally relate to wireless communication and to techniques and apparatuses for reconfigurable intelligent surface (RIS) calibration.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

SUMMARY

Figure 1:
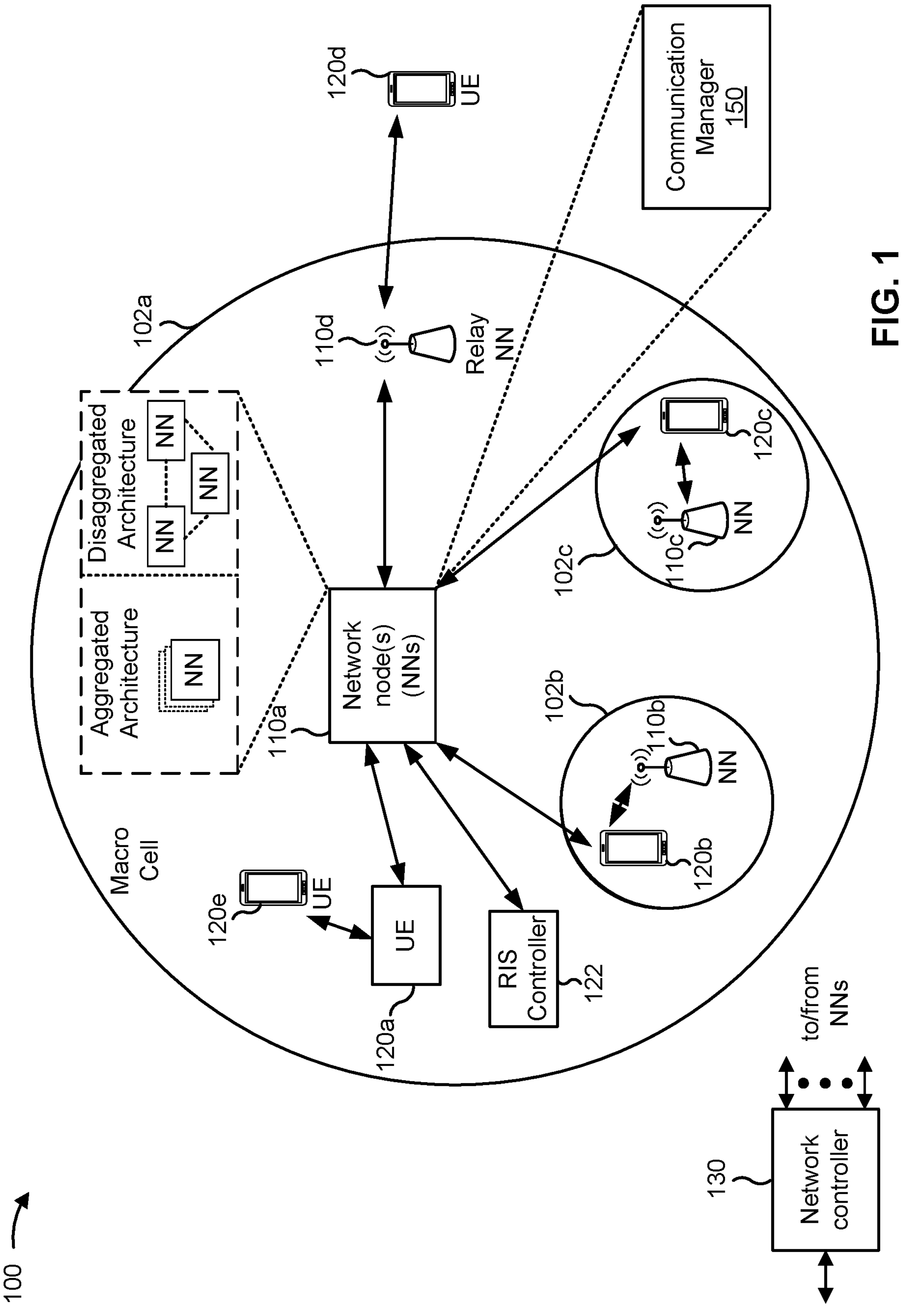
FIG. 1 is a diagram illustrating an example of a wireless network, in accordance with the present disclosure.

In some implementations, an apparatus for wireless communication at a network node includes one or more memories; and one or more processors, coupled to the one or more memories, configured to cause the network node to: transmit, to a reconfigurable intelligent surface (RIS) controller associated with an RIS, a configuration for applying an RIS pattern; receive, from a network element, a measurement report indicating received observations of pilot signals reflected by the RIS in accordance with the RIS pattern; and transmit, to the RIS controller and based at least in part on the measurement report, an indication of one or more of an updated codebook or a phase drift associated with a calibration of the RIS.

In some implementations, an apparatus for wireless communication at a network node includes one or more memories; and one or more processors, coupled to the one or more memories, configured to cause the network node to: receive, from an RIS controller associated with an RIS, an indication of an RIS capability that indicates that the RIS is capable of a self-calibration; and receive, from the RIS controller and based at least in part on the RIS capability, a rejection or a confirmation indicating whether the self-calibration is performed at the RIS.

In some implementations, a method of wireless communication performed by a network node includes transmitting, to an RIS controller associated with an RIS, a configuration for applying an RIS pattern; receiving, from a network element, a measurement report indicating received observations of pilot signals reflected by the RIS in accordance with the RIS pattern; and transmitting, to the RIS controller and based at least in part on the measurement report, an indication of one or more of an updated codebook or a phase drift associated with a calibration of the RIS.

In some implementations, a method of wireless communication performed by a network node includes receiving, from an RIS controller associated with an RIS, an indication of an RIS capability that indicates that the RIS is capable of a self-calibration; and receiving, from the RIS controller and based at least in part on the RIS capability, a rejection or a confirmation indicating whether the self-calibration is performed at the RIS.

In some implementations, a non-transitory computer-readable medium storing a set of instructions for wireless communication includes one or more instructions that, when executed by one or more processors of a network node, cause the network node to: transmit, to an RIS controller associated with an RIS, a configuration for applying an RIS pattern; receive, from a network element, a measurement report indicating received observations of pilot signals reflected by the RIS in accordance with the RIS pattern; and transmit, to the RIS controller and based at least in part on the measurement report, an indication of one or more of an updated codebook or a phase drift associated with a calibration of the RIS.

In some implementations, a non-transitory computer-readable medium storing a set of instructions for wireless communication includes one or more instructions that, when executed by one or more processors of a network node, cause the network node to: receive, from an RIS controller associated with an RIS, an indication of an RIS capability that indicates that the RIS is capable of a self-calibration; and receive, from the RIS controller and based at least in part on the RIS capability, a rejection or a confirmation indicating whether the self-calibration is performed at the RIS.

In some implementations, an apparatus for wireless communication includes means for transmitting, to an RIS controller associated with an RIS, a configuration for applying an RIS pattern; means for receiving, from a network element, a measurement report indicating received observations of pilot signals reflected by the RIS in accordance with the RIS pattern; and means for transmitting, to the RIS controller and based at least in part on the measurement report, an indication of one or more of an updated codebook or a phase drift associated with a calibration of the RIS.

In some implementations, an apparatus for wireless communication includes means for receiving, from an RIS controller associated with an RIS, an indication of an RIS capability that indicates that the RIS is capable of a self-calibration; and means for receiving, from the RIS controller and based at least in part on the RIS capability, a rejection or a confirmation indicating whether the self-calibration is performed at the RIS.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

DETAILED DESCRIPTION

A reconfigurable intelligent surface (RIS) may be a low-cost array of passive elements, which may each be configured to impart phase shifts to their respective incident signals and achieve anomalous reflection/refraction. Elements at the RIS may be susceptible to aging or to environmental variation, and hence phase shifts realized by constituent elements in response to control inputs may drift over time, which may result in phase drift (e.g., an original phase shift plus a drift). However, the RIS and/or an RIS controller may be unaware of a set of phase drifts that are at specific RIS elements in response to control inputs may hamper the RIS's ability to redirect incident energy towards a desired direction. Due to a lack of knowledge of the phase drift, the RIS may redirect incident energy towards an undesired direction, such that a UE may receive an insufficient amount of energy from the RIS, which may degrade an overall system performance.

Various aspects relate generally to RIS calibration. Some aspects more specifically relate to RIS calibration (or recalibration) when an RIS does not have a self-calibration capability. In some examples, a network node may transmit, to an RIS controller, a configuration for applying an RIS pattern. The network node may receive, from a network element, such as a transmission reception point (TRP) or a user equipment (UE), a measurement report. The measurement report may indicate received observations of pilot signals reflected by the RIS in accordance with the RIS pattern. The network node may transmit, to the RIS controller and based at least in part on the measurement report, an indication of an updated codebook or a phase drift associated with the calibration of the RIS. In this example, the network node may compute the phase drift based at least in part on the measurement report, and the network node may indicate the phase drift to the RIS controller.

Particular aspects of the subject matter described in this disclosure can be implemented to realize one or more of the following potential advantages. In some examples, by implementing calibration (or recalibration) at the RIS, the described techniques can be used to correct phase drifts associated with the RIS, which may improve an overall performance of the RIS. The RIS may not have a self-calibration capability, so the network node may assist the RIS with the calibration. Alternatively, the network node may assist the RIS with the calibration to reduce an amount of resources that would otherwise be consumed by the RIS to perform the calibration. By correct the phase drift via the calibration, the RIS may be able to provide meaningful gains, especially since the RIS is incapable of amplification and relies only on redirecting incident energy via accurate beamforming.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a UE 120 or multiple UEs 120 (shown as a UE 120*a*, a UE 120*b*, a UE 120*c*, a UE 120*d*, and a UE 120*e*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, an unmanned aerial vehicle, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHZ) and FR2 (24.25 GHz-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a network node (e.g., the network node 110) may include a communication manager 150. As described in more detail elsewhere herein, the communication manager 150 may transmit, to an RIS controller associated with an RIS, a configuration for applying an RIS pattern; receive, from a network element, a measurement report indicating received observations of pilot signals reflected by the RIS in accordance with the RIS pattern; and transmit, to the RIS controller and based at least in part on the measurement report, an indication of one or more of an updated codebook or a phase drift associated with a calibration of the RIS. In some aspects, as described in more detail elsewhere herein, the communication manager 150 may receive, from an RIS controller associated with an RIS, an indication of an RIS capability that indicates that the RIS is capable of a self-calibration; and receive, from the RIS controller and based at least in part on the RIS capability, a rejection or a confirmation indicating whether the self-calibration is performed at the RIS. Additionally, or alternatively, the communication manager 150 may perform one or more other operations described herein.

As indicated above, FIG. 1 is provided as an example. Other examples may differ from what is described with regard to FIG. 1.

Figure 2:
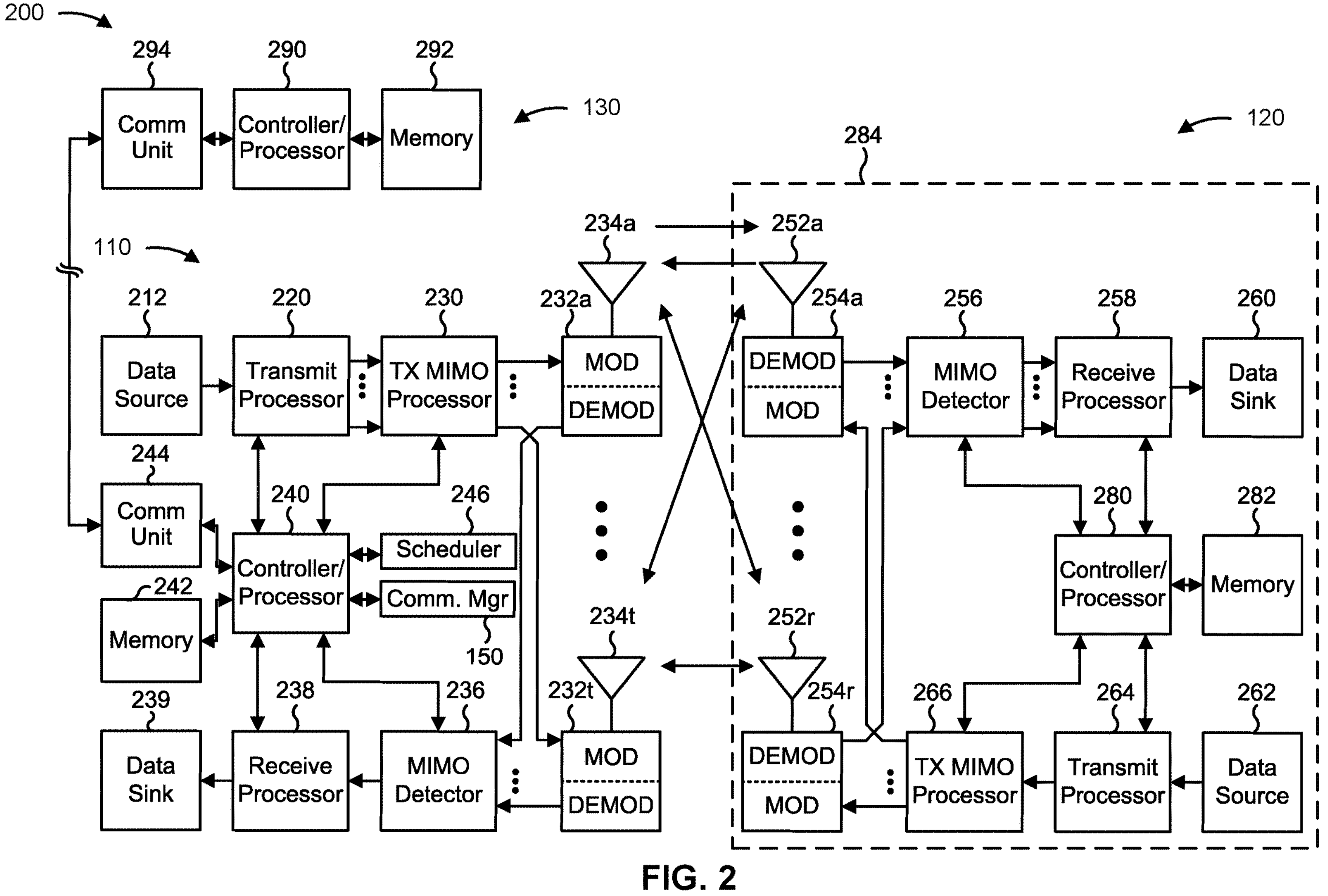
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7A-7B, 8, 9A-9D, 10A-10D, and 11-14).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7A-7B, 8, 9A-9D, 10A-10D, and 11-14).

The controller/processor 240 of the network node 110, the controller/processor 280 of the UE 120, and/or any other component(s) of FIG. 2 may perform one or more techniques associated with RIS calibration, as described in more detail elsewhere herein. For example, the controller/processor 240 of the network node 110, the controller/processor 280 of the UE 120, and/or any other component(s) of FIG. 2 may perform or direct operations of, for example, process 1200 of FIG. 12, process 1300 of FIG. 13, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 1200 of FIG. 12, process 1300 of FIG. 13, and/or other processes as described herein. In some examples, executing instructions may include running the instructions, converting the instructions, compiling the instructions, and/or interpreting the instructions, among other examples.

In some aspects, a network node (e.g., the network node 110) includes means for transmitting, to an RIS controller associated with an RIS, a configuration for applying an RIS pattern; means for receiving, from a network element, a measurement report indicating received observations of pilot signals reflected by the RIS in accordance with the RIS pattern; and/or means for transmitting, to the RIS controller and based at least in part on the measurement report, an indication of one or more of an updated codebook or a phase drift associated with a calibration of the RIS. In some aspects, the network node includes means for receiving, from an RIS controller associated with an RIS, an indication of an RIS capability that indicates that the RIS is capable of a self-calibration; and/or means for receiving, from the RIS controller and based at least in part on the RIS capability, a rejection or a confirmation indicating whether the self-calibration is performed at the RIS. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
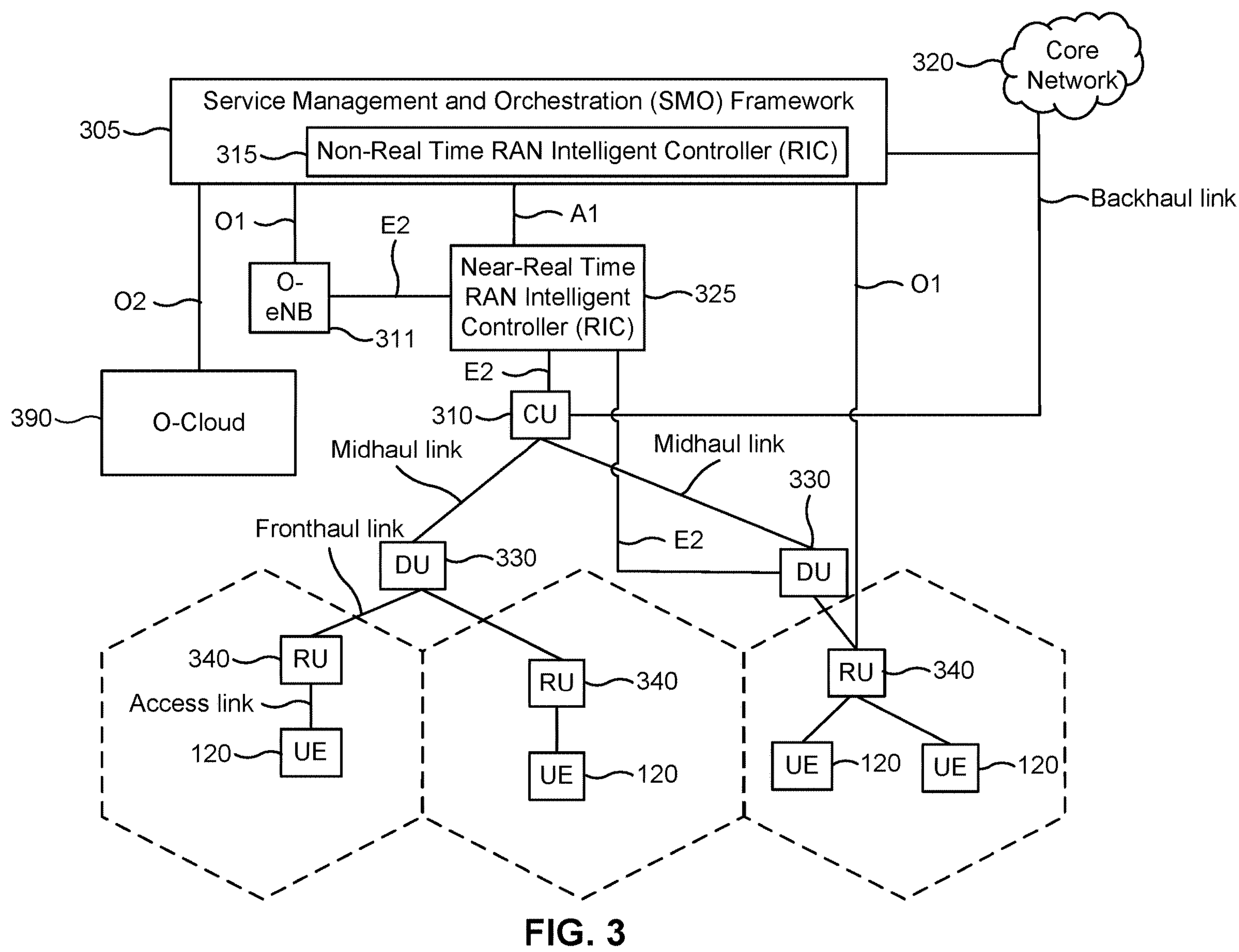
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUS 310, the DUs 330, the RUs 340, as well as the Near-RT RICs 325, the Non-RT RICs 315, and the SMO Framework 305, May include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

An RIS may be a network element that is employed to extend NR coverage with negligible power consumption. The RIS may be a mirror-like near passive device. The RIS may include X elements in a horizontal direction and Y elements in a vertical direction. In other words, the RIS may include X by Y elements. Each element may reflect a waveform that is incident to a surface of the element. The waveform may be transmitted by a network node or a UE. Each element may reflect the waveform based at least in part on a reflection coefficient, such that the waveform may be reflected to a direction. The waveform that strikes the element may be an incident waveform, and the waveform that is reflected from the element may be a reflected waveform. The direction toward which the waveform is reflected may be a function of the reflection coefficient and/or a phase associated with the element that reflects the waveform.

The direction toward which the waveform is reflected, or a reflection direction, may be controlled by the network node. For example, the network node may transmit an indication of a reflection direction to an RIS controller associated with the RIS. The indication of the reflection direction may indicate the reflection coefficient and/or phase for each element associated with the RIS. The RIS controller may adjust the reflection coefficient and/or phase for each element based at least in part on the indication received from the network node.

Figure 4:
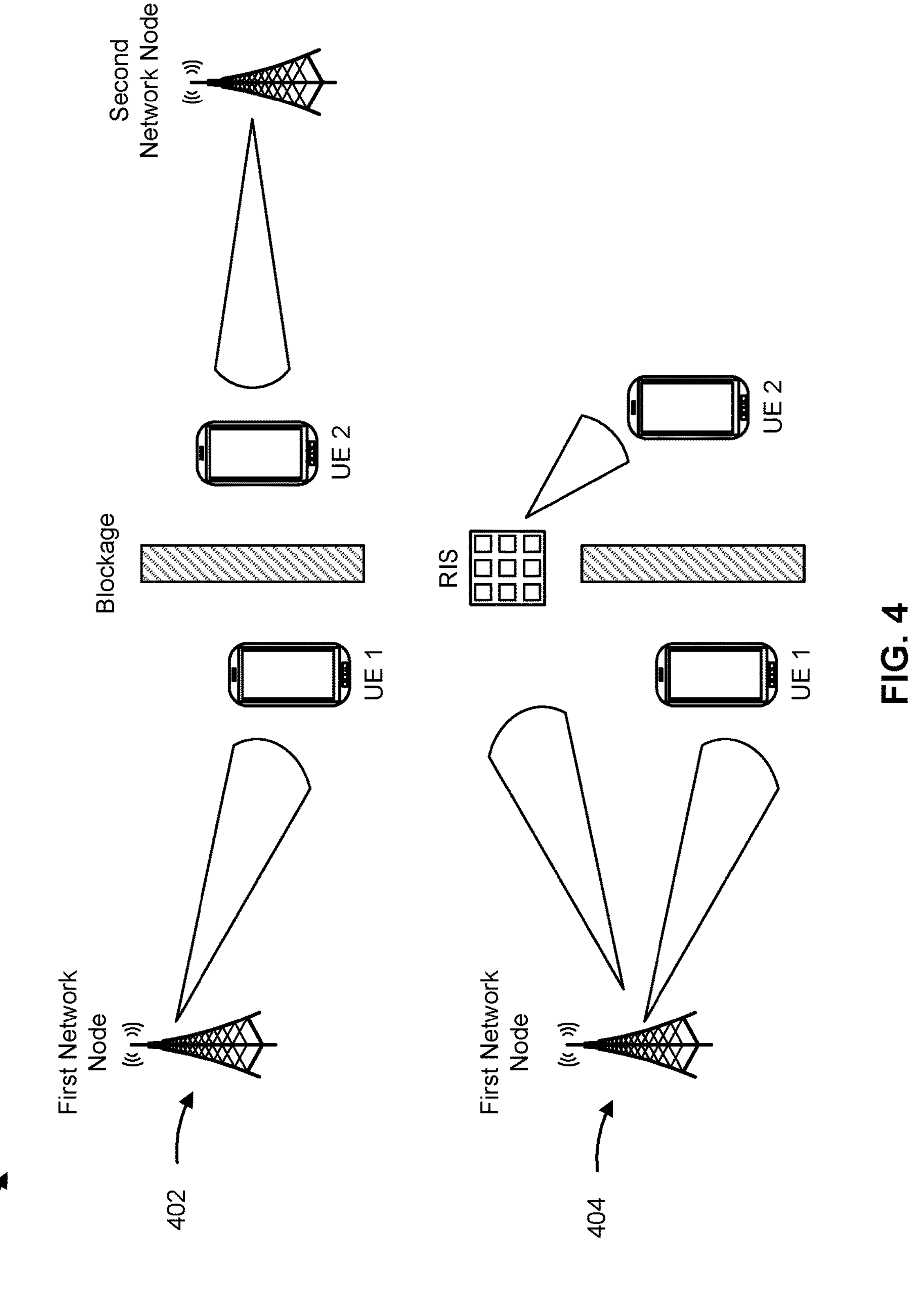
FIG. 4 is a diagram illustrating an example of a reconfigurable intelligent surface (RIS), in accordance with the present disclosure.

FIG. 4 is a diagram illustrating an example 400 of an RIS, in accordance with the present disclosure.

As shown by reference number 402, a first network node may transmit a first downlink transmission to a first UE (UE1). A second network node may transmit a second downlink transmission to a second UE (UE2). The first UE and the second UE may be separated by a blockage. As a result, downlink transmissions from the first network node may not be received by the second UE, and downlink transmissions from the second network node may not be received by the first UE.

As shown by reference number 404, an RIS may be employed in proximity to the blockage. The first network node may transmit a first downlink transmission to the first UE and a second downlink transmission to the RIS. The RIS may include a plurality of elements that reflect the second downlink transmission in a direction toward the second UE. As a result, the first network node may effectively perform downlink transmissions to the second UE via the RIS, even though the blockage is present between the first network node and the second UE.

As indicated above, FIG. 4 is provided as an example. Other examples may differ from what is described with regard to FIG. 4.

An RIS may be a low-cost array of passive elements, which may each be configured to impart phase shifts to their respective incident signals and achieve anomalous reflection/refraction. However, low-cost elements at the RIS may be more susceptible to ageing or to environmental variations, and hence phase shifts realized by these constituent elements in response to control inputs may drift over time, which may result in phase drift (e.g., an original phase shift plus a drift). As a result, recalibration may be needed for the RIS to provide meaningful gains, especially since the RIS may be incapable of amplification and may rely only on redirecting the incident energy via accurate beamforming.

In the presence of such phase drifts, a network node that manages the RIS may need to update codebooks used to achieve anomalous reflection/refraction. The codebooks may need to be updated because the codebooks may be matched to the original phase shift and may not account for the phase drift. The codebooks may need to be matched to phase shifts which the RIS elements can actually realize in response to different control inputs. Similarly, an autonomous RIS controller is to be able to determine the phase drifts in order to properly adapt RIS patterns to available channel state information (CSI). A recalibration process should be efficient, since a number of elements at the RIS may be relatively large, as well as effective, even though the network node may not have access to the RIS elements and be unable to directly measure the realized phase shifts.

Figure 5:
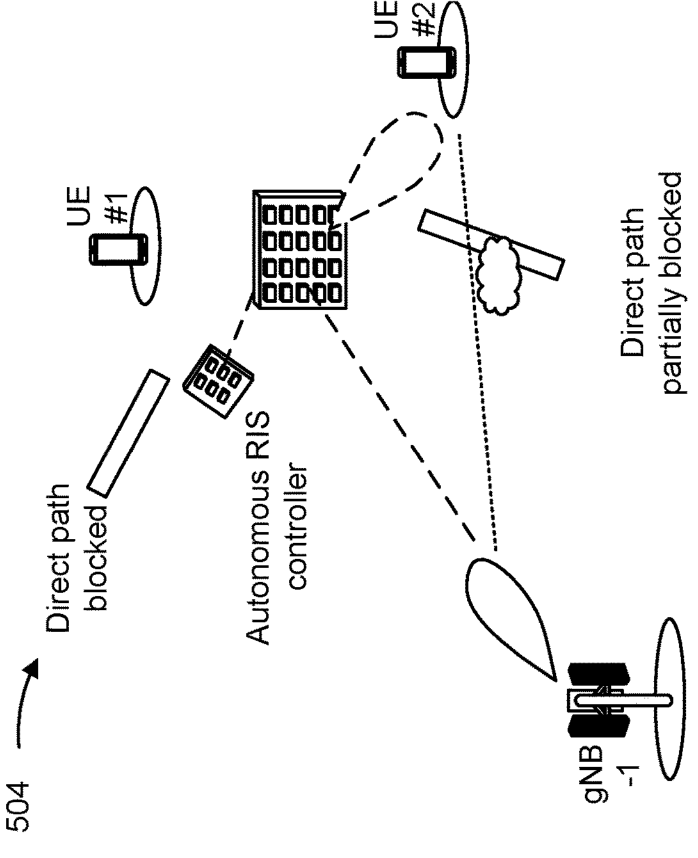
FIG. 5 is a diagram illustrating an example of an impact of reconfigurable intelligent surface (RIS) phase drift, in accordance with the present disclosure.
Figure 5:
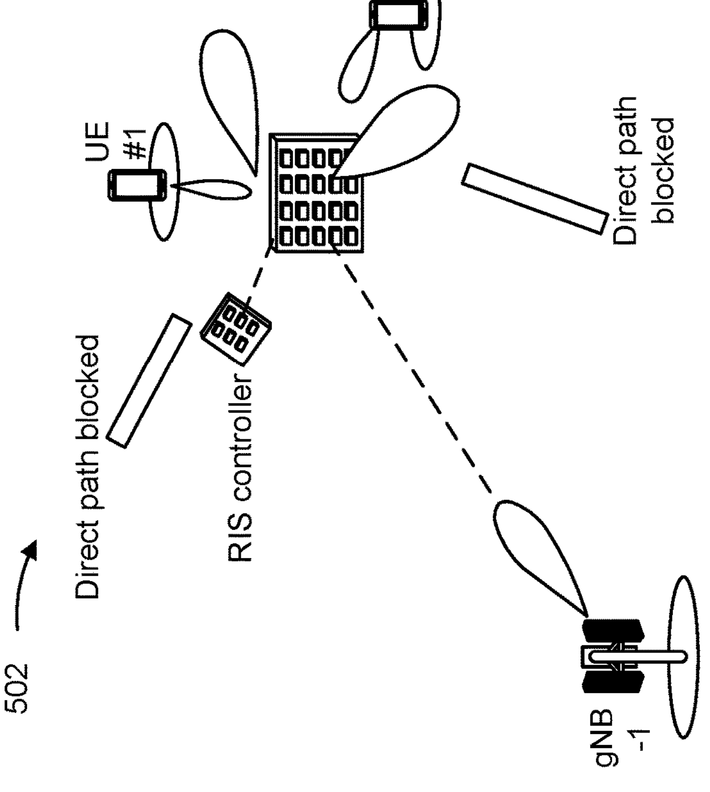

FIG. 5 is a diagram illustrating an example 500 of an impact of RIS phase drift, in accordance with the present disclosure.

As shown by reference number 502, a network node may communicate with a first UE (UE1) and a second UE (UE2) via an RIS. Phase drifts at RIS elements may result in original RIS codebooks becoming mismatched, which may cause the RIS to direct energy at a direction that is not towards the first UE or the second UE. As shown by reference number 504, without knowing actual realized RIS element phases (including drifts) for different control inputs, an autonomous RIS controller may be unable to properly adapt RIS patterns based at least in part on available CSI. In this example, an RIS pattern applied by the autonomous RIS controller may fail to improve a rank for an effective channel associated with the second UE.

Further, ideally for each RIS element n, reflection coefficients may be in accordance with:

$$\Omega = \left\{ e^{\frac{j2\pi(m-1)}{M}} : 1 \le m \le M \right\}.$$

However, in practice due to phase drift $\phi_{n,m}$ of $n^{th}$ RIS element and $m^{th}$ reflection coefficient), an alphabet for an $n^{th}$ RIS element may become:

$$\Omega_n' = \left\{ e^{j\phi_{n,m}} e^{\frac{j2\pi(m-1)}{M}} : 1 \le m \le M \right\}.$$

As indicated above, FIG. 5 is provided as an example. Other examples may differ from what is described with regard to FIG. 5.

Figure 6:
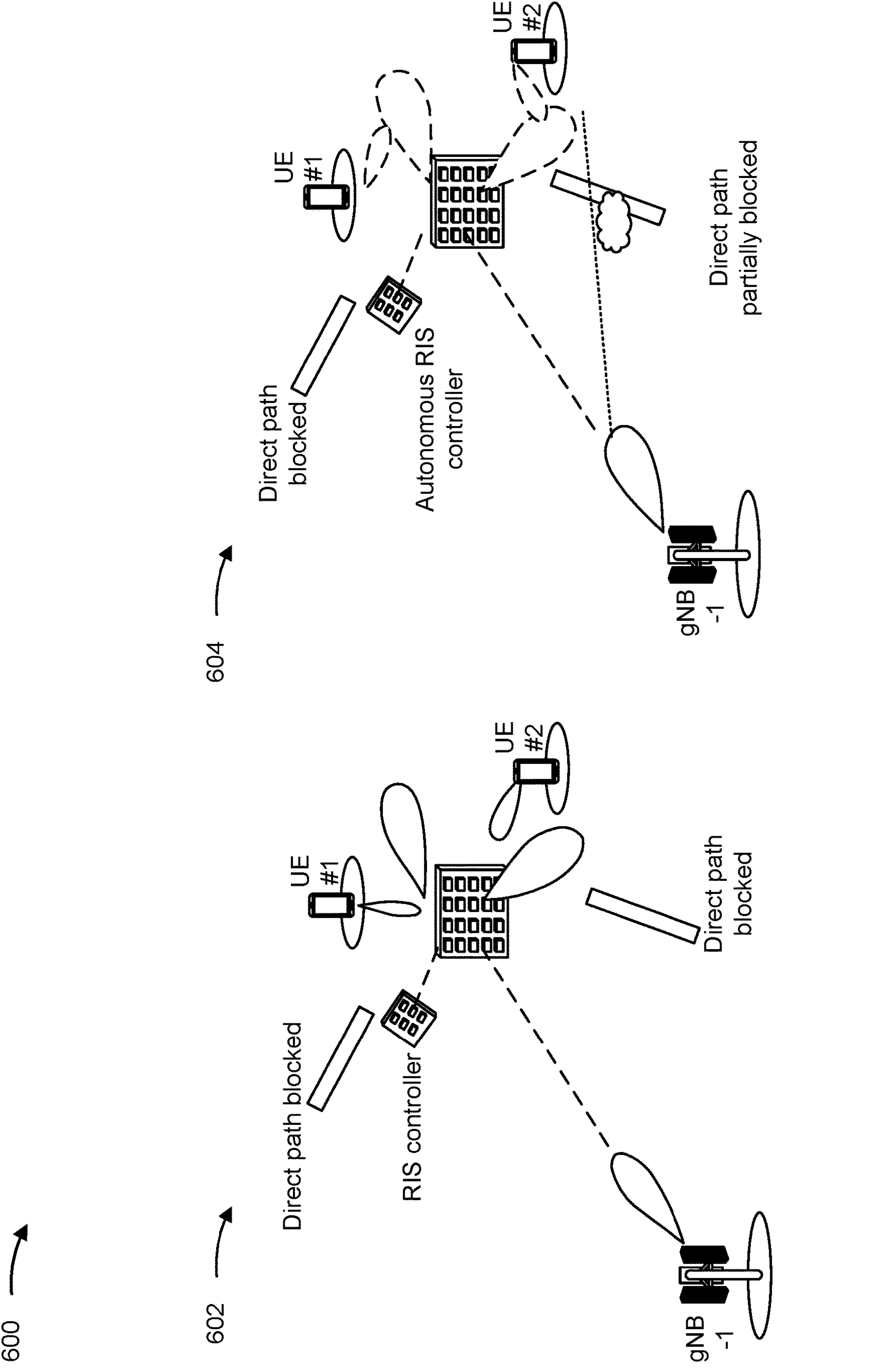
FIG. 6 is a diagram illustrating an example of an avoidance of recalibration of an RIS, in accordance with the present disclosure.

FIG. 6 is a diagram illustrating an example 600 of an avoidance of recalibration of an RIS, in accordance with the present disclosure.

As shown by reference number 602, a network node may communicate with a first UE (UE1) and a second UE (UE2) via an RIS. Phase drifts at RIS elements may result in original RIS codebook(s) becoming mismatched, which may cause the RIS to direct energy at a direction that is not towards the first UE or the second UE. The phase drifts may hamper an autonomous RIS controller's ability to adapt an RIS pattern to a sensed channel. As shown by reference number 604, adapting an RIS pattern along with network node and/or UE beams without recalibration may only partially resolve a mismatch in case of codebook based RIS control and still sacrifice potential gains (e.g., over 4 dB).

As indicated above, FIG. 6 is provided as an example. Other examples may differ from what is described with regard to FIG. 6.

Elements at an RIS may be susceptible to ageing or to environmental variation, and hence phase shifts realized by these constituent elements in response to control inputs may drift over time, which may result in phase drift (e.g., an original phase shift plus a drift). However, the RIS and/or an RIS controller may be unaware of a set of phase drifts that are at specific RIS elements in response to control inputs may hamper the RIS's ability to redirect incident energy towards a desired direction. Due to a lack of knowledge of the phase drift, the RIS may redirect incident energy towards an undesired direction, such that a UE may receive an insufficient amount of energy from the RIS, which may degrade an overall system performance.

In various aspects of techniques and apparatuses described herein, a network node may transmit, to an RIS controller, a configuration for applying an RIS pattern. The network node may receive, from a network element, such as a transmission reception point (TRP) or a UE, a measurement report. The measurement report may indicate received observations of pilot signals reflected by the RIS in accordance with the RIS pattern. The network node may transmit, to the RIS controller and based at least in part on the measurement report, an indication of an updated codebook or a phase drift associated with a calibration of the RIS. In this example, the network node may compute the phase drift based at least in part on the measurement report, and the network node may indicate the phase drift to the RIS controller.

In some aspects, to support efficient and effective recalibration and determination of phase drifts, various approaches may define signaling that allows a network node to configure an OTA calibration phase and check for trigger conditions. Further, such approaches may be defined for utilizing RIS calibration codebooks, sharing correlation/subspace information about phase drifts, group-wise estimation of phase drifts for overhead reduction, and/or down-time request based signaling for self-calibration capable RISs.

In some aspects, by implementing calibration (or recalibration) at the RIS, the described techniques can be used to correct phase drifts associated with the RIS, which may improve an overall performance of the RIS. The RIS may not have a self-calibration capability, so the network node may assist the RIS with the calibration. Alternatively, the network node may assist the RIS with the calibration to reduce an amount of resources that would otherwise be consumed by the RIS to perform the calibration. By correct the phase drift via the calibration, the RIS may be able to provide meaningful gains, especially since the RIS is incapable of amplification and relies only on redirecting incident energy via accurate beamforming.

Figure 7A:
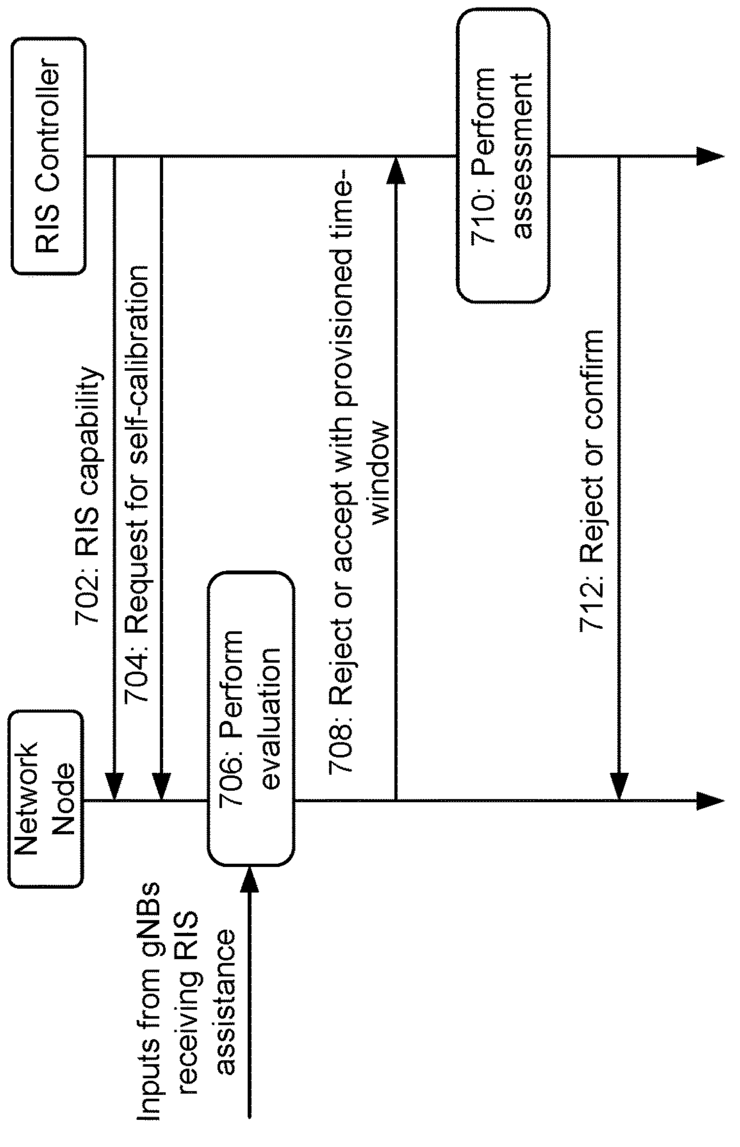
FIGS. 7A-7B are diagrams illustrating examples associated with self-calibration, in accordance with the present disclosure.
Figure 7B:
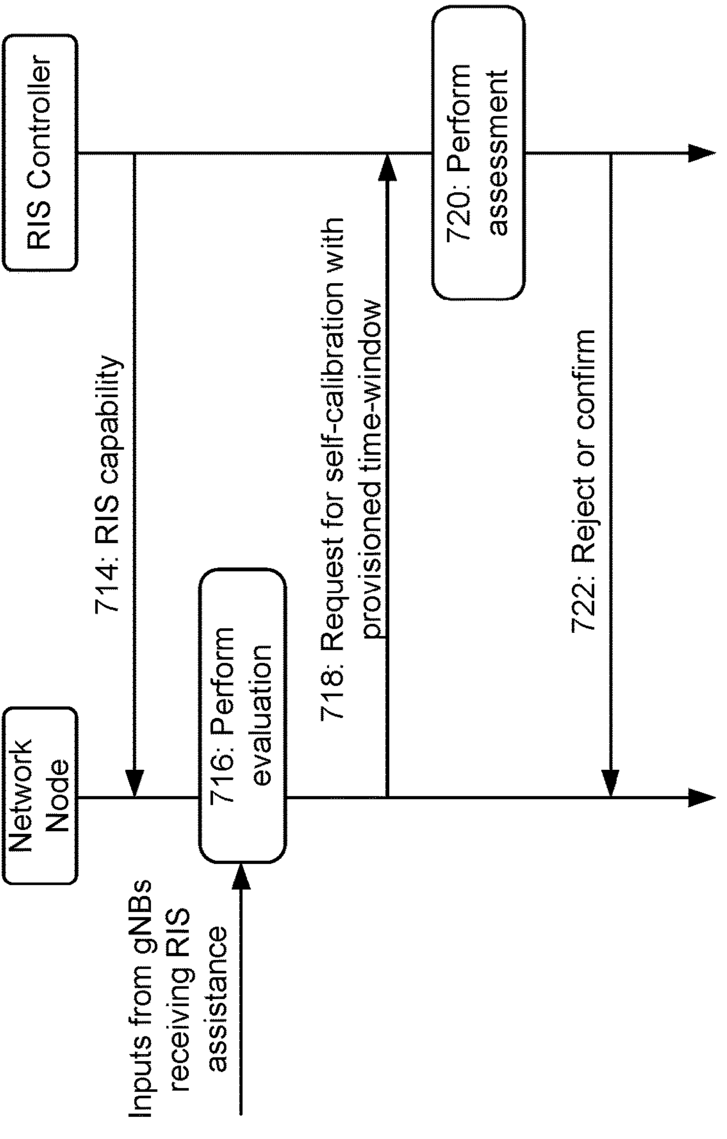

FIGS. 7A-7B are diagrams illustrating examples 700 associated with self-calibration, in accordance with the present disclosure.

In some aspects, a more capable RIS (or repeater node or forwarding node) may have the capability to self-calibrate (e.g., determine phase drifts of constituent elements on its own). While no external assistance from other nodes may be needed for the self-calibration itself, the RIS may still need down-time for such self-calibration, during which time the RIS may not be expected to assist any other network node. An explicit self-calibration request message may be reserved for this purpose, which may be transmitted by an RIS controller associated with the RIS to a network node, where the self-calibration request message may indicate a requested down-time duration. The network node may either signal a rejection or an acceptance of the self-calibration request message, which may involve taking into account inputs received from network nodes being assisted by the RIS of interest. The acceptance may be qualified by transmitting an alternative allowed down-time and associated time window (possibly a smaller down-time and time window). The RIS may then either decide to self-calibrate within the indicated time duration, or the RIS may forego the self-calibration when the RIS is not able to self-calibrate during the time duration. Signaling to indicate a selection made by the RIS controller to the network entity may be provisioned. Alternatively, the self-calibration request message may be transmitted by the network node to the RIS controller, which may then either accept (and proceed to self-calibrate in a provisioned time-window) or reject the self-calibration request message.

As shown in FIG. 7A, and by reference number 702, an RIS controller may transmit, to a network node, an indication of an RIS capability. The network node may receive, from the RIS controller associated with an RIS, the indication of the RIS capability, which may indicate whether the RIS is capable of a self-calibration. The self-calibration may be associated with a self-determination of a phase drift associated with the RIS. As shown by reference number 704, the RIS controller may transmit, to the network node, a request for self-calibration down-time. The network node may receive, from the RIS controller, the request for self-calibration that indicates a down-time for performing the self-calibration. As shown by reference number 706, the network node may perform an evaluation of the request for self-calibration down-time, which may be based at least in part on inputs received from network nodes receiving RIS assistance. The network node may perform, based at least in part on an input received from another network node receiving assistance from the RIS, an evaluation of the request. As shown by reference number 708, the network node may transmit, to the RIS controller, an indication of a rejection or an acceptance with a provisioned time window (and possibly a modified down-time). The network node may transmit, to the RIS controller and based at least in part on the evaluation, a rejection or an acceptance with a provisioned time window. As shown by reference number 710, the RIS controller may perform an assessment of the rejection or the acceptance indicated by the network node. A RIS controller assessment for performing the self-calibration may be based at least in part on the rejection or the acceptance with the provisioned time window. As shown by reference number 712, the RIS controller may transmit, to the network node, an indication of a reject or a confirm. The network node may receive, from the RIS controller and based at least in part on the RIS capability, a rejection or a confirmation indicating whether the self-calibration is performed at the RIS.

As shown in FIG. 7B, and by reference number 714, an RIS controller may transmit, to a network node, an indication of an RIS capability. The network node may receive, from the RIS controller associated with an RIS, the indication of the RIS capability, which may indicate whether the RIS is capable of a self-calibration. The self-calibration may be associated with a self-determination of a phase drift associated with the RIS. As shown by reference number 716, the network node may perform an evaluation, which may be based at least in part on inputs received from network nodes receiving RIS assistance. The network node may perform, based at least in part on an input received from another network node receiving assistance from the RIS, an evaluation of the RIS capability. As shown by reference number 718, the network node may transmit, to the RIS controller and based at least in part on the evaluation, a request for self-calibration with a provisioned time window. The network node may transmit, to the RIS controller and based at least in part on the evaluation, a request for self-calibration with the provisioned time window. As shown by reference number 720, the RIS controller may perform an assessment of the request indicated by the network node. A RIS controller assessment for performing the self-calibration may be based at least in part on the request for self-calibration with the provisioned time window. As shown by reference number 722, the RIS controller may transmit, to the network node, an indication of a reject or a confirm. The network node may receive, from the RIS controller and based at least in part on the RIS capability, a rejection or a confirmation indicating whether the self-calibration is performed at the RIS.

As indicated above, FIGS. 7A-7B are provided as examples. Other examples may differ from what is described with regard to FIGS. 7A-7B.

Figure 8:
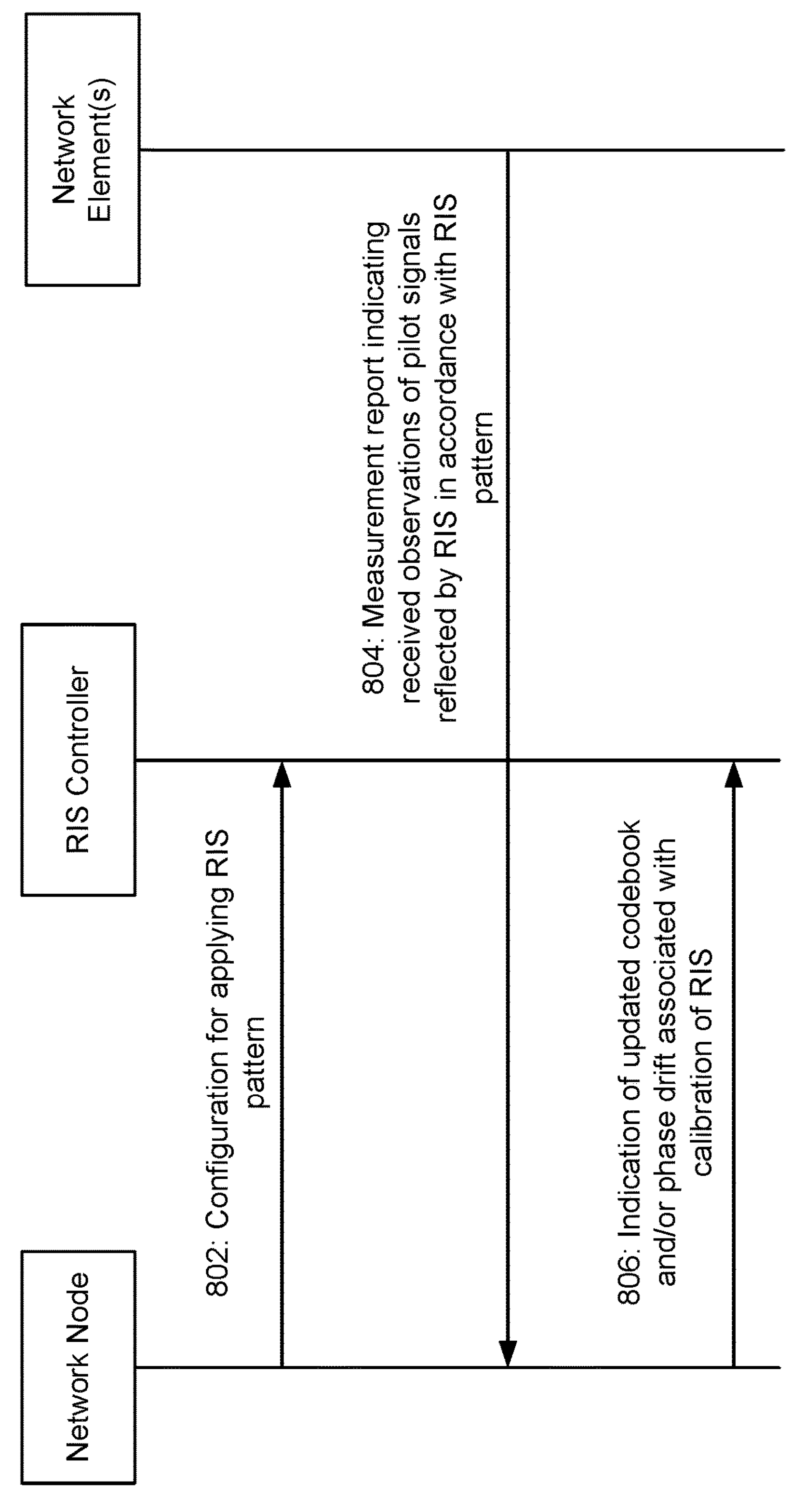
FIG. 8 is a diagram illustrating an example associated with RIS calibration, in accordance with the present disclosure.

FIG. 8 is a diagram illustrating an example 800 associated with RIS calibration, in accordance with the present disclosure. As shown in FIG. 8, example 800 includes communication between a network node (e.g., network node 110), an RIS controller (e.g., RIS controller 122), and a network element (e.g., network node 110*b*, such as a TRP, or UE 120). In some aspects, the network node, the RIS controller, and the network element may be included in a wireless network, such as wireless network 100.

As shown by reference number 802, the network node, such as a network entity, may transmit, to the RIS controller associated with an RIS, a configuration for applying an RIS pattern. The configuration may configure the RIS controller to apply the RIS pattern or a codeword from a calibration codebook, in accordance with a time schedule for applying the RIS pattern over a calibration phase excluding an additional training phase. In some aspects, the configuration may indicate the additional training phase within a calibration sounding phase. The additional training phase may include multiple symbol durations during which the network element transmits the pilot signals or measures the received observations. In some aspects, the configuration may indicate a periodicity and an offset for a time-varying RIS control. Further, the RIS may be set to a switched off state, a soft-off state in which the RIS hops between randomized RIS patterns, or a configured state to reflect to a separate direction from another network element.

In some aspects, the network node may transmit, to the network element, a configuration for time-frequency resources for transmitting the pilot signals, time-frequency resources for the received observations of pilot signals reflected by the RIS, a transmit beam for the network element, and/or a receive beam for the network element.

As shown by reference number 804, the network node may receive, from the network element, a measurement report indicating received observations of pilot signals reflected by the RIS in accordance with the RIS pattern. The RIS pattern may be an applied sequential time-varying RIS pattern. The measurement report may indicate supporting information. The supporting information may indicate location information associated with the network element, and/or an angular direction of reference elements associated with the network element with respect to an RIS array reference element.

In some aspects, the network element may be a second network element. The network node may identify a first network element to transmit the pilot signals. The network node may identify the second network element to receive the pilot signals reflected by the RIS and indicate the measurement report. In some aspects, the network node may identify the network element to transmit the pilot signals. The network node may identify the network element to receive the pilot signals reflected by the RIS and indicate the measurement report. The network element may be associated with a full-duplex operation. In some aspects, the pilot signals reflected by the RIS may be associated with a reflected signal frequency or polarization translation.

In some aspects, the received observations of pilot signals reflected by the RIS may be associated with a signal-to-noise ratio (SNR) that satisfies a threshold. The received observations of pilot signals reflected by the RIS may be associated with a normalization and/or a combining across observations corresponding to a same RIS pattern.

As shown by reference number 806, the network node may transmit, to the RIS controller and based at least in part on the measurement report, an indication of an updated codebook and/or a phase drift associated with a calibration (or recalibration) of the RIS. The RIS may not be associated with a self-calibration capability. The network node may compute the phase drift based at least in part on the received observations of pilot signals reflected by the RIS and an effective channel, and the network node may indicate the phase drift to the RIS controller. In some aspects, the network node may perform a phase drift estimation in a group-wise manner or in a block-wise manner by fitting one common phase drift per control input to each group or block of RIS elements. RIS elements may be portioned into multiple groups and a common control input is imposed on a plurality of elements within a group in accordance with the group-wise manner.

In some aspects, the network node may receive an indication of an RIS capability involving expected phase shifts imparted by each constituent element in response to a plurality of available control inputs that are to be applied on the constituent element. In some aspects, the network node may receive an indication of a grouping configuration that is applicable on an RIS array. The grouping configuration may be a partition of RIS array element into groups such that a common control input is applied to a plurality of elements of a group.

In some aspects, the network node may configure the network element to maintain no phase variation across successive transmissions or receptions during a sounding phase. In some aspects, the network node may identify multiple pairs of network elements for the RIS, where each pair may include a first network element to transmit pilot signals and a second network element to receive the pilot signals after reflection from the RIS and compute measurement reports. In some aspects, a calibration or a recalibration may be triggered based at least in part on a signal quality satisfying a threshold, and/or sensor information from the RIS. In some aspects, the RIS controller may be associated with multiple RIS arrays, and the calibration may be associated with one or more RIS arrays of the multiple RIS arrays. In some aspects, the calibration may be associated with a non-mobility. In some aspects, the network node may receive an indication that the network element is at least partially capable of determining the phase drift.

As indicated above, FIG. 8 is provided as an example. Other examples may differ from what is described with regard to FIG. 8.

Figure 9A:
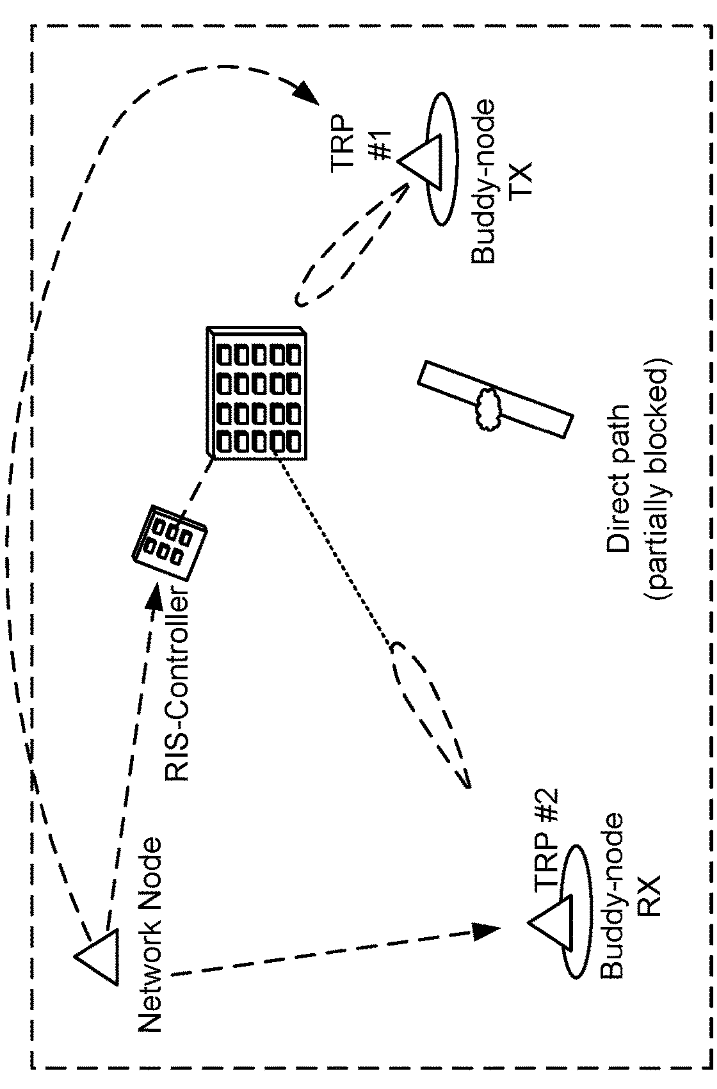
FIGS. 9A-9D are diagrams illustrating examples associated with RIS calibration, in accordance with the present disclosure.
Figure 9A:
Figure 9B:
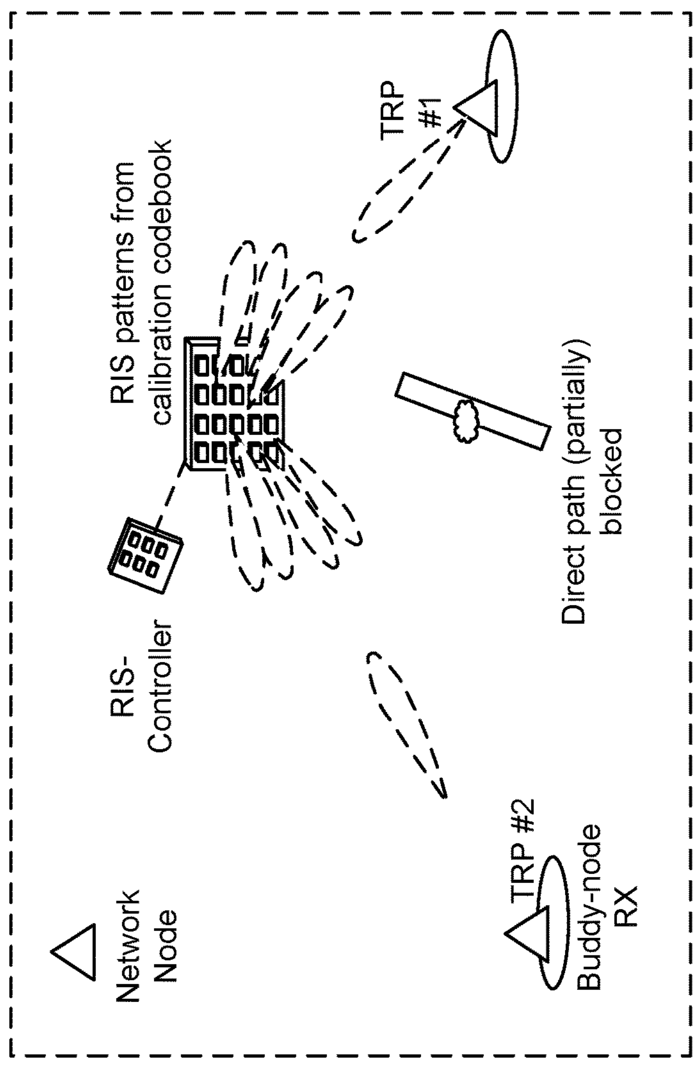

FIGS. 9A-9B are diagrams illustrating examples 900 associated with RIS calibration, in accordance with the present disclosure.

As shown in FIG. 9A, in a recalibration for an RIS without a self-calibration capability, a network node may identity a TRP (a first TRP, a first gNB or a first UE) as a buddy transmitter (TX) (or buddy-node TX), which may transmit pilot signals. The network node may also identify a TRP (a second TRP, a second gNB, or a second UE) as a buddy receiver (RX) (or buddy-node RX), which may receive and compute measurement reports. The network node may configure an RIS controller to apply RIS patterns as per a time schedule.

In some aspects, regarding an identification of buddy (or anchor) TX nodes and RX nodes, the network node may configure time-frequency resources over which the pilot signals are transmitted and received observations are collected. The network node may configure TX beams and Rx beams for the buddy TX. In some aspects, the network node may determine an RIS capability, which may include an expected phase-shift imparted by each constituent element in response to all available control inputs that may be applied on that element. The network node may determine grouping configurations that may be applied on an RIS array. Each grouping configuration may be a partition of RIS array elements into groups, such that a common control input may be applied to all elements of a group. When such information is not available at the network node, the information may be provided by an RIS mobile termination (RIS-MT) or some other entity to the network node.

As shown in FIG. 9B, the buddy TX may transmit the pilot signals. The pilot signals may be reflected by the RIS based at least in part on applied sequential time-varying RIS patterns. The buddy RX may determine a measurement report using received observations of the pilot signals.

In some aspects, the network node may provide an indication of an RIS calibration (or recalibration) codebook and a configuration of a time schedule. The network node may indicate the RIS calibration codebook to the RIS controller. The network node may optionally configure an additional training (sounding) phase within a calibration sounding phase. The additional training phase may include multiple symbol durations, during which the buddy TX may transmit the pilot signals and the buddy RX may measure received observations, and the RIS may be set accordingly. The RIS may be set to a switched off state (e.g., configured to an absorbing state). The RIS may be set to a soft-off state in which the RIS may hop between randomized patterns (dithered patterns). The RIS may be set to a configured state (or pattern) to reflect to a significantly separate direction from the buddy RX. The additional training phase may allow the buddy RX to estimate CSI pertaining to a direct buddy TX-to-buddy RX link while minimizing a contribution from an RIS reflect path.

In some aspects, the network node may configure the RIS controller to apply selected RIS patterns (or codewords) from the RIS calibration codebook, along with the time schedule of applying the selected RIS patterns over the calibration sounding phase (excluding the additional training phase). In some aspects, the corresponding received observations may be measured at the buddy RX. The received observations (which may be complex valued, for instance, as in-phase and quadrature (I/Q) samples) may be obtained with a sufficient SNR, which may be ensured by an appropriate selection of the RIS calibration codebook, the codewords, and the time schedule, and which may enable a processing gain at the buddy RX. The received observations may contain a sufficient number of observations for estimating a set of phase drifts. The received observations may be processed by the buddy RX, which may include a normalization and a combining across observations corresponding to the same RIS pattern.

Figure 9C:
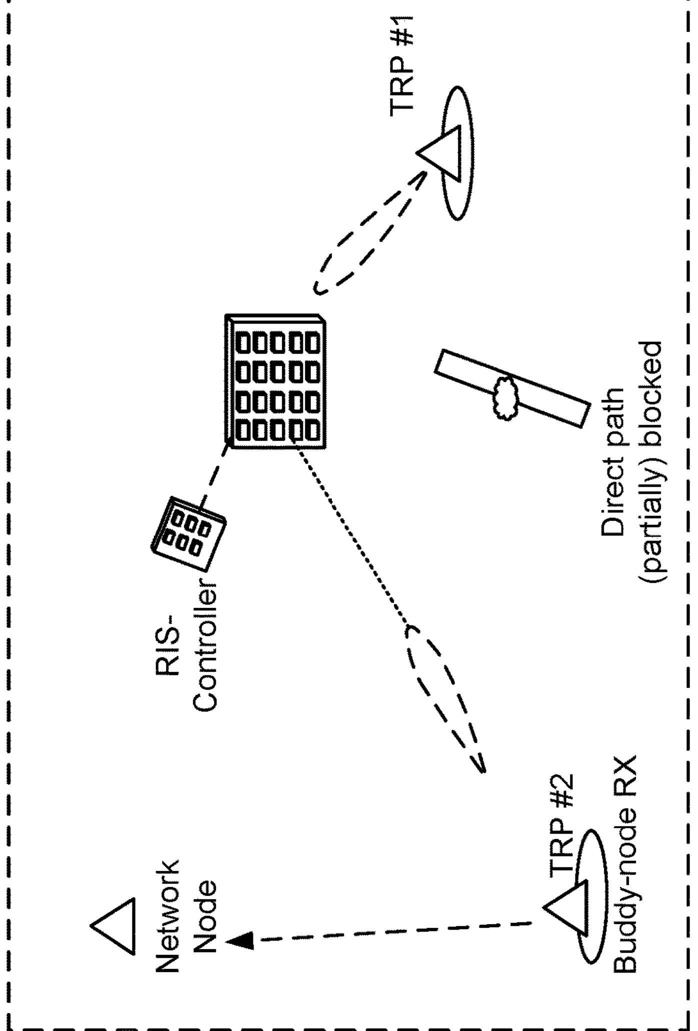

As shown in FIG. 9C, the buddy RX may convey the measurement report, along with supporting information, to the network node. The supporting information may indicate a location of the buddy TX and the buddy RX. The supporting information may indicate angular directions of buddy TX and buddy RX reference elements with respect to an RIS array reference element, which may allow the network node to obtain a cascade channel estimate.

In some aspects, the received observations (which may be complex valued) may be conveyed by the buddy RX to the network node (for instance, as I/Q samples). The received observations may be conveyed via the measurement report. The received observations may be possibly after a quantization as indices from a scalar or vector quantization codebook. The network node, using the measurement report indicating the received observations, may estimate (or recover) the phase drifts by solving, for example, a constrained least-squares problem. For example, the network node may perform a drift estimation in accordance with:

$$\min_{\substack{x:\\ x=\left[e^{j\phi_{11}},\ldots,e^{j\phi_{1M}},\ldots,e^{j\phi_{N1}},\ldots,e^{j\phi_{NM}}\right]\\ \phi_{nm}\in[0,2\pi)\forall n,m}} \|y-Hx\|^2,$$

where y are normalized received observations, H is an effective channel, and x are the phase drifts.

In some aspects, an effective channel H=f(z,$\{\Gamma_n\}$) may be a function of a cascade channel estimate, z, and a calibration codebook, $\{\Gamma_n\}$. Further, the network node may perform a drift plus channel estimation with an uncertainty correction in accordance with:

$$\min_{\substack{x,\,z:\\ x=\left[e^{j\phi_{11}},\ldots,e^{j\phi_{1M}},\ldots,e^{j\phi_{N1}},\ldots,e^{j\phi_{NM}}\right]\\ \phi_{nm}\in[0,2\pi)\forall n,m\\ z\in C}} \|y-Hx\|^2,$$

where z∈C is associated with an uncertainty region about available estimate 2.

Figure 9D:
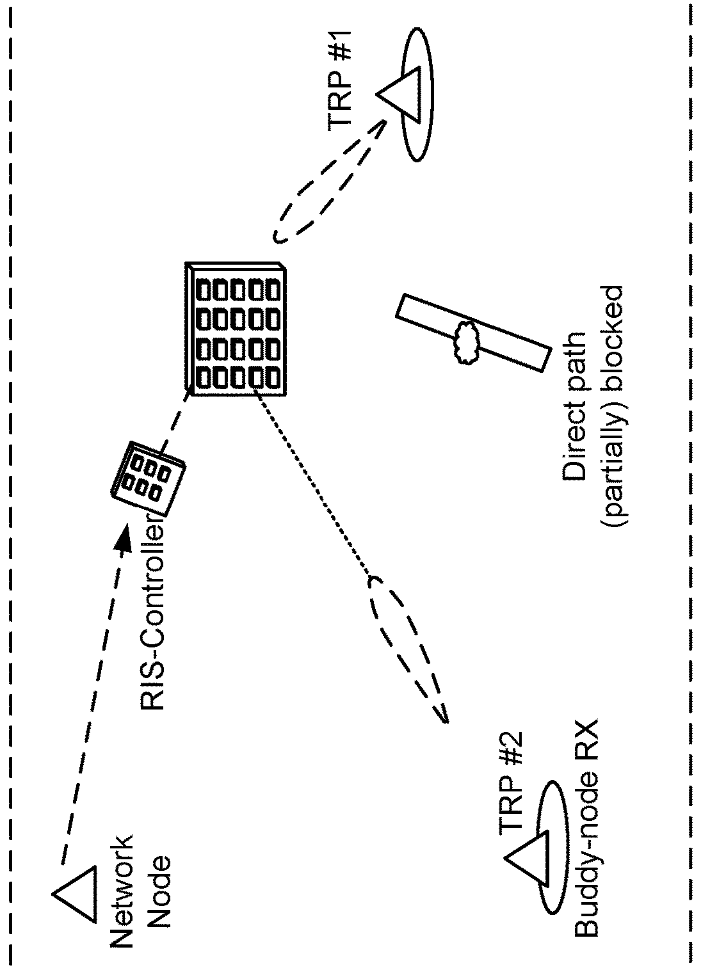

As shown in in FIG. 9D, the network node may update codebooks based at least in part on the measurement report. The network node may convey the updated codebooks to the RIS controller. Further, pre-drifts may be determined by the network node and conveyed to the RIS controller in the case of an autonomous RIS controller. Thus, the network node may convey the updated codebooks or phase drifts to the RIS controller.

As indicated above, FIGS. 9A-9D are provided as examples. Other examples may differ from what is described with regard to FIGS. 9A-9D.

FIGS. 10A-10D are diagrams illustrating examples 1000 associated with RIS calibration, in accordance with the present disclosure.

Figure 10A:
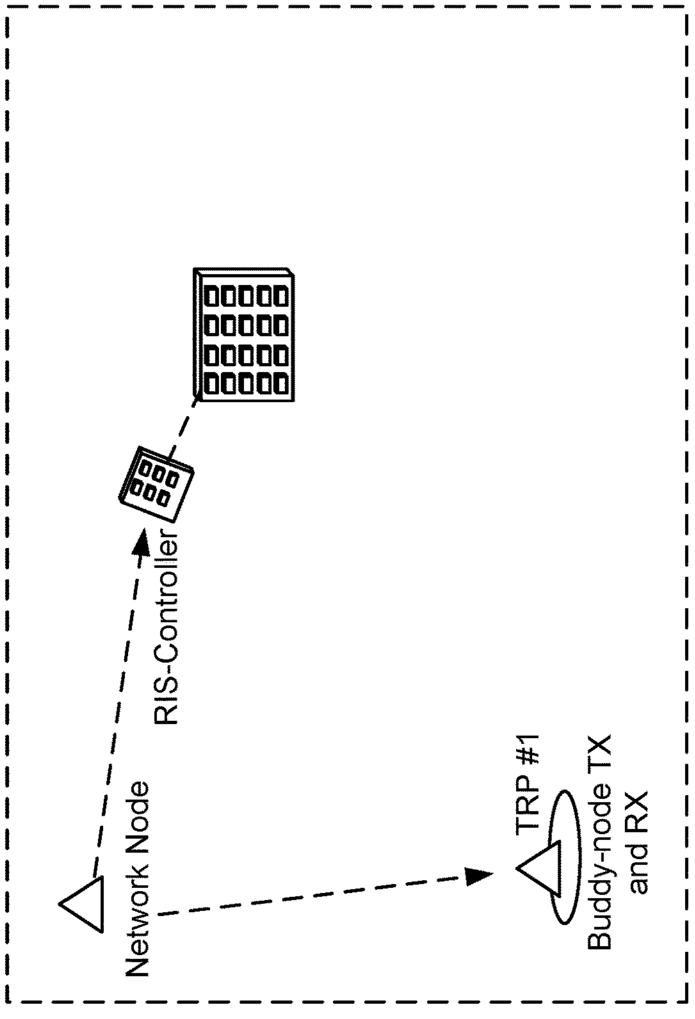
FIGS. 10A-10D are diagrams illustrating examples associated with RIS calibration, in accordance with the present disclosure.

As shown in FIG. 10A, in a recalibration for an RIS using a retro-reflection, a network node may identity a TRP (or a gNB or a UE) as a buddy TX (or buddy TX node), which may transmit pilot signals. The same TRP (or the same gNB or the same UE) may also act as a buddy RX (or buddy RX node), which may receive and compute measurement reports. In other words, the network node may identify a buddy TX and RX (or buddy TX and RX node). The network node may configure an RIS controller to apply retro-reflection RIS patterns as per a time schedule.

In some aspects, in an RIS calibration using the retro-reflection, the network node may configure an RIS calibration codebook at the TRP, which may serve as the buddy TX and RX. The buddy TX and RX may have a transmit beam, which may be used to communicate with the RIS (e.g., an RIS controller, which may be associated with an in-band RIS-MT) and also transmit to the RIS. The transmit beam may yield a beam (receive beam) for receiving from the RIS, as well as a beam for receiving reflections from the RIS, via a beam correspondence. The network node or the buddy TX and RX may indicate, to the RIS controller, an RIS calibration codebook identifier and indices identifying configurations in that RIS calibration codebook. These codewords should achieve a relatively good retro-reflection (e.g., a good portion of incident energy reflected by the RIS is towards that buddy TX and RX), while ensuring that sufficiently different sets of reflection coefficients are assigned to RIS elements across these codewords to allow for phase drift estimation. Further, the network node or the buddy TX and RX may indicate, to the RIS controller, a time-hopping schedule containing an order of applying these configurations on the RIS and a duration for which each configuration should be maintained by the RIS.

Figure 10B:
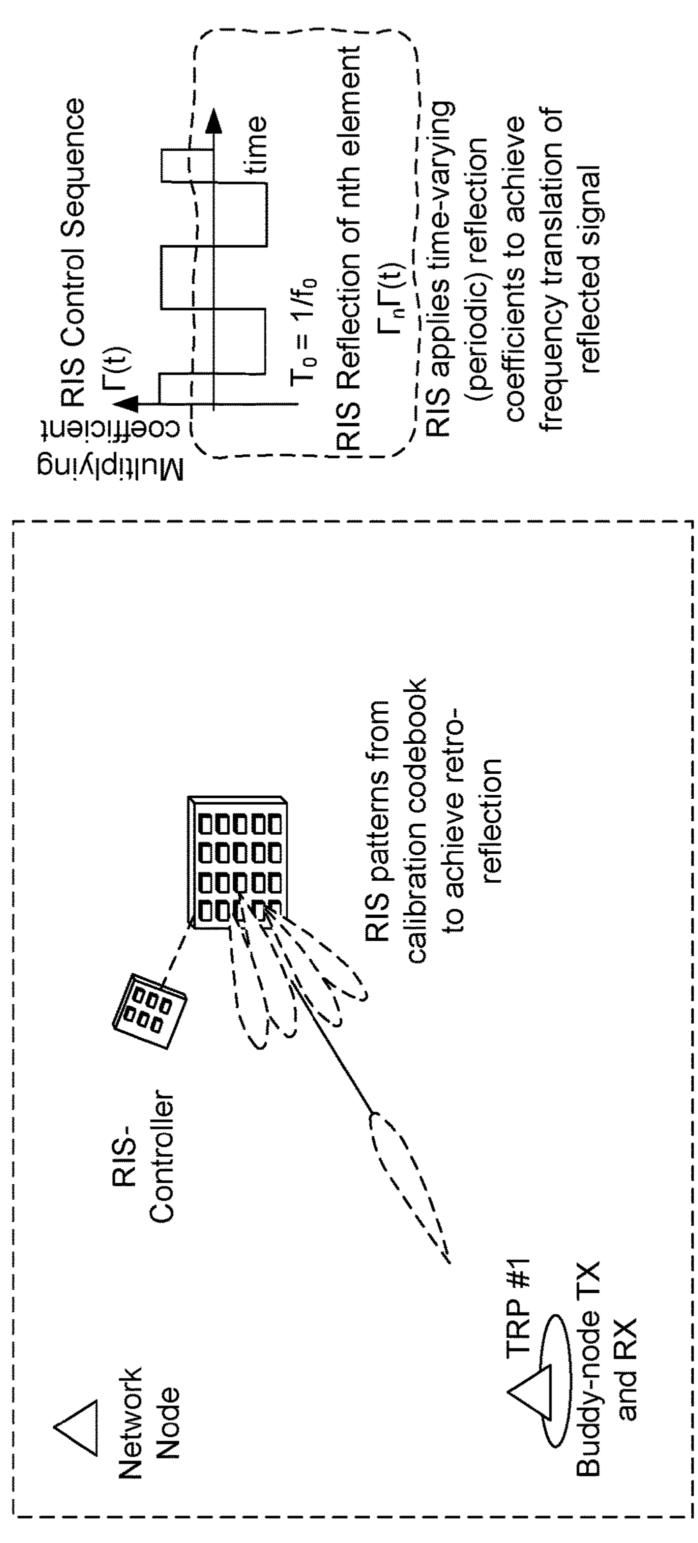

As shown in FIG. 10B, the buddy TX and RX may transmit the pilot signals. The pilot signals may be reflected by the RIS based at least in part on applied sequential time-varying RIS patterns. The buddy TX and RX may determine a measurement report using received observations of the pilot signals. In other words, the measurement report may be determined at the buddy TX and RX via a full-duplex operation using the received observations of the pilot signals. In some aspects, the buddy TX and RX may transmit reference symbols using a beam over multiple time-frequency resources, where the reference symbols may be associated with the pilot signals. The buddy TX and RX may also measure a reflected signal over those time-frequency resources via the full-duplex operation.

Figure 10C:
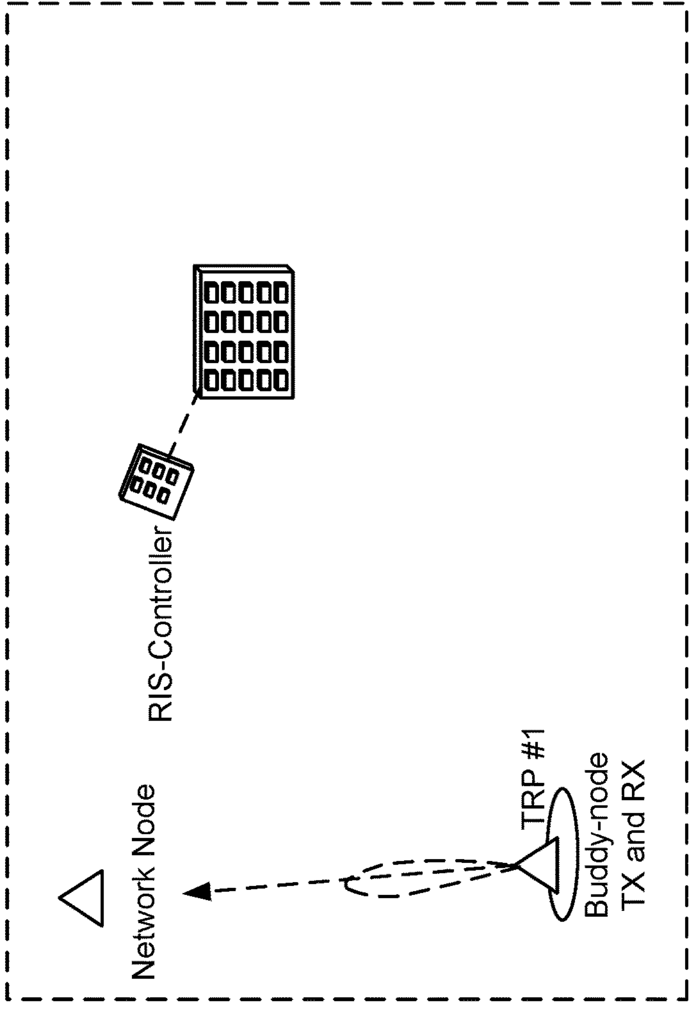

As shown in FIG. 10C, the buddy TX and RX may convey the measurement report to the network node. The buddy TX and RX may convey the measurement report along with supporting information.

Figure 10D:
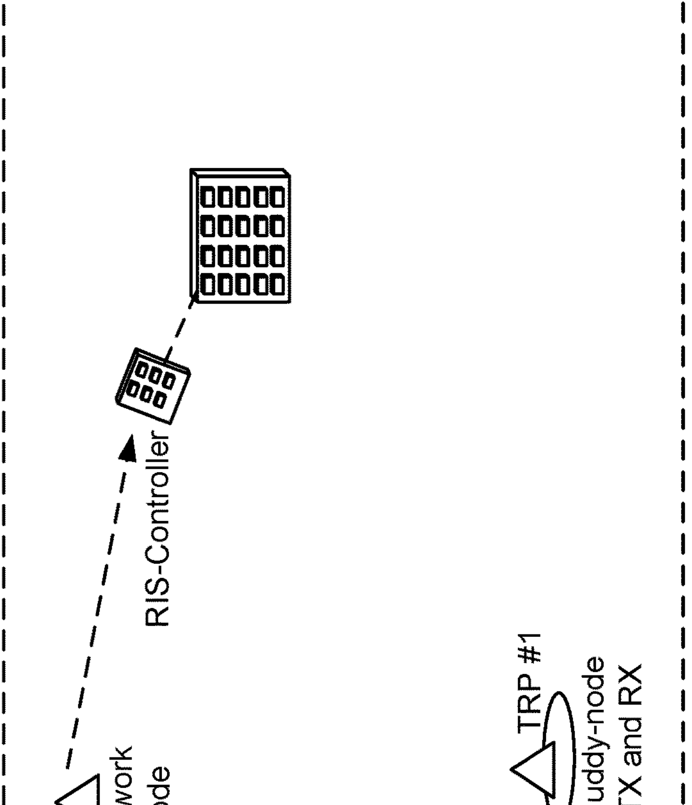

As shown in FIG. 10D, the network node may update codebooks based at least in part on the measurement report. The network node may convey the updated codebooks to the RIS controller. Further, pre-drifts may be determined by the network node and conveyed to the RIS controller in the case of an autonomous RIS controller. Thus, the network node may convey the updated codebooks or phase drifts to the RIS controller.

In some aspects, based at least in part on available received signal measurements, the buddy TX and RX may report, to the network node, received signal measurements (e.g., I/Q samples) after signal processing by the buddy TX and RX. The buddy TX and RX may report the received signal measurements to the network node for RIS element phase drift estimation, along with needed supporting information. Alternatively, the buddy TX and RX may perform a phase drift estimation itself.

In some aspects, the recalibration for the RIS may use the retro-reflection and a reflected signal frequency or polarization translation (e.g., as shown in FIG. 10B). The RIS may apply time-varying (periodic) reflection coefficients to achieve a frequency translation of a reflected signal. The network node or the buddy TX and RX may indicate, to the RIS controller, a periodicity and an offset for a time-varying RIS control. The RIS, or a network-controlled repeater (NCR), may be capable of applying a polarization conversion, such that an incident signal at one polarization may be retro-reflected at another polarization, which may be based at least in part on signaling to indicate a capability and associated configurations. The buddy TX and RX may measure a reflected signal over time-frequency resources and harmonics (translated frequencies) via a sub-band full-duplex operation.

As indicated above, FIGS. 10A-10D are provided as examples. Other examples may differ from what is described with regard to FIGS. 10A-10D.

In some aspects, group-wise (or block-wise) phase drift estimation may be employed, which may exploit correlations among phase drifts. An estimation of phase drifts for each RIS element and each of its control inputs can involve a relatively large number of received observations (and associated pilot signal transmissions), and hence may incur a relatively large recalibration overhead. With group-wise or block-wise phase drift estimation, one common phase drift per control input may be fit to each group or block of RIS elements. In case of group-wise control, RIS elements may be partitioned into multiple groups, and a common control input may be imposed on a plurality of elements (e.g., all elements) within a group. A calibration codebook may include a grouping configuration and each of its patterns may indicate control input to be applied on a group-wise manner.

In some aspects, true phase drifts may be different for different elements of a group for any given control input, but fitting one common phase drift per group per control input may retrieve some of the available calibration gains while reducing a required overhead in terms of a number of symbols over which RIS patterns from the calibration codebook are tried. Such an approach may exploit any correlation among phase drifts within a group. Alternatively, a restriction of one common phase drift per element (across all its control inputs) may be imposed to obtain an overhead reduction. The restriction may be further extended to one common phase drift per group (across all its control inputs) to obtain further overhead reduction. The phase drifts considering all RIS elements and control inputs may lie in a smaller dimensional subspace, which may be used in designing the calibration codebook and in an estimation/recovery of phase drifts. Subspace information may be conveyed to a network node by another entity (e.g., an operations and management (OAM) entity or a third party RIS manager).

In some aspects, an impact of phase drifts may be isolated from other sources of degradation. An estimation of phase drift for each RIS element and each of its control inputs from received observations obtained during a calibration phase may necessitate that other sources of phase errors/mismatch be removed. One other source of such error may involve phase variations across successive pilot transmissions by a buddy TX due to variations in its TX chain. The buddy TX may be required to maintain a requirement of no phase variations across successive transmissions during a sounding phase. Another source of such error may involve phase variations across successive receptions by a buddy RX due to variations in its RX chain. The buddy RX may be required to maintain a requirement of no phase variations across successive receptions during the sounding phase.

In some aspects, a capability of a node (e.g., a TX node or an RX node) with respect to serving as a buddy node may be indicated to the network node. For example, the capability may indicate whether the node is able to satisfy such requirements, which may possibly be qualified by further restricting the capability to a certain number of successive transmissions or receptions over an associated bandwidth.

Figure 11:
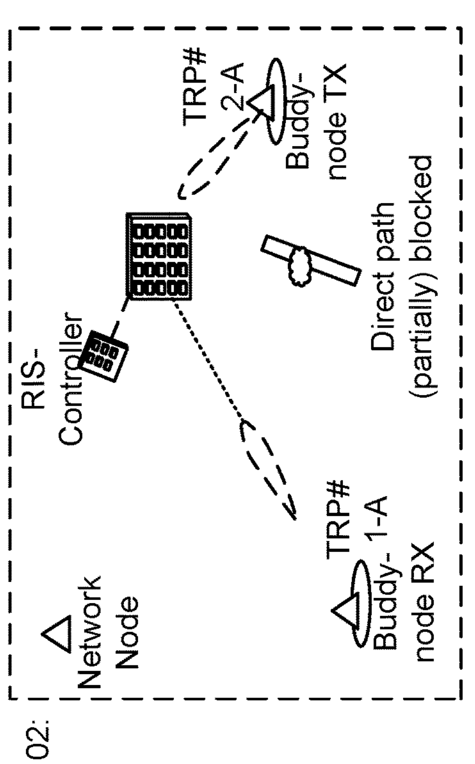
FIG. 11 is a diagram illustrating an example associated with RIS calibration, in accordance with the present disclosure.
Figure 11:
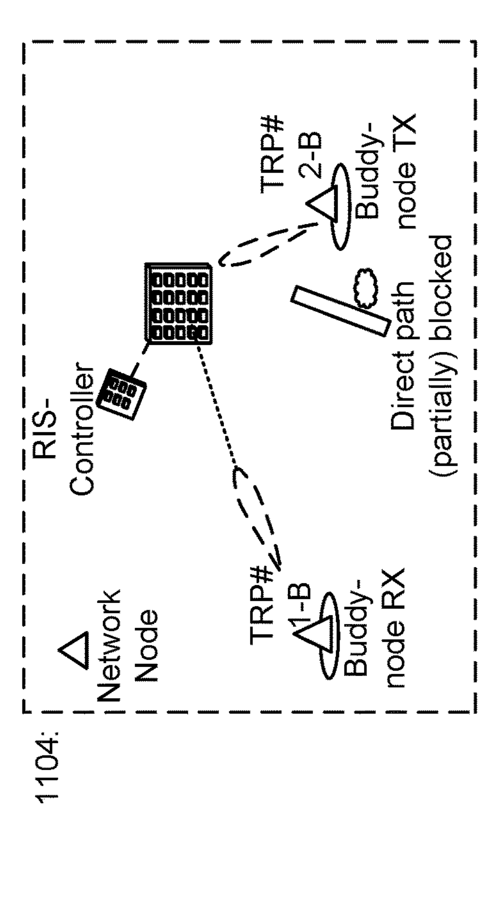
Figure 11:
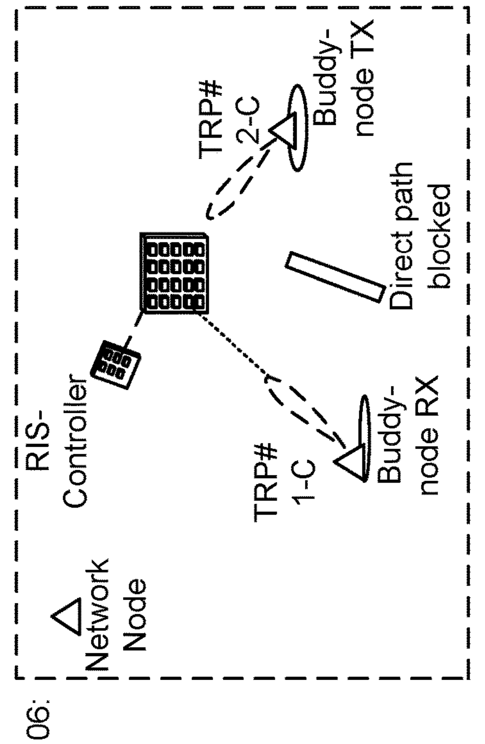

FIG. 11 is a diagram illustrating an example 1100 associated with RIS calibration, in accordance with the present disclosure.

In some aspects, a network node may identify multiple pairs of buddy TXs and buddy RXs for the same RIS. In each buddy TX-RX pair, a TRP (or UE) buddy TX may transmit pilot signals, and a TRP (or UE) buddy RX may receive the pilot signals after reflection from that RIS and compute measurement reports. Each buddy TX-RX pair may satisfy requirements on not introducing other additional phase errors. For each buddy TX-RX pair, time frequency resources over which pilot signals are transmitted and received observations are collected may also be configured. For each buddy TX-RX pair, TX and RX beams may be configured. An RIS capability and supporting information associated with each buddy TX-RX pair may be provided to the network node.

In some aspects, the network node may compare received signal reports from different buddy TX-RX pairs to determine whether a signal quality (such as signal strength) has degraded below a threshold to trigger a recalibration. In some aspects, alternative recalibration triggers may be defined. Sensor information (e.g., temperature) from an RIS or an NCR may be used to trigger (re) calibration. An RIS or an NCR-MT may provide such an indication and/or request for OTA calibration. Calibration, and associated measurements (or self-calibration down-time) may be configured to be periodic or semi-persistent.

As shown by reference number 1102, a network node may identify a first buddy TX-RX pair, such as a TRP #1-A and a TRP #2-A. As shown by reference number 1104, the network node may identify a second buddy TX-RX pair, such as a TRP #1-B and a TRP #2-B. As shown by reference number 1106, the network node may identify a third buddy TX-RX pair, such as a TRP #1-C and a TRP #2-C. Thus, the network node may identify multiple pairs of buddy TXs and buddy RXs for the same RIS.

As indicated above, FIG. 11 is provided as an example. Other examples may differ from what is described with regard to FIG. 11.

In some aspects, an RIS controller may have multiple associated RIS arrays. A certain RIS or NCR array to be calibrated may be indicated, and signaling for such indication may be supported. In some aspects, a mobility may be avoided for OTA calibration in the case of a vehicle-mounted RIS or NCR. Signaling may be defined to restrict combining across measurements in order to ensure a stable channel across measurements. In some aspects, rather than a buddy RX reporting its raw (or averaged or normalized) measurements, the buddy RX may be able to perform some processing (to the extent of solving a drift estimation problem, or partially solving the drift estimation problem). In this case, new signaling may be supported, which may allow the buddy RX to indicate such a capability to solve or partially solve for a phase drift estimation. The new signaling may allow the buddy RX to be provided with needed supporting information to solve or partially solve for the phase drift estimation. In some aspects, any of the buddy TXs or the buddy RXs may be the same as the network node. In some aspects, an OTA calibration may also exploit multiple buddy TX and RX pairs. The network node may solve for drift estimation using observations from a plurality of buddy RXs (e.g., all buddy RXs) (and their supporting information), and/or the network node may combine individual phase drift estimates (for instance, weighted sum) determined by different buddy RXs (which have indicated required capability and are provided associated supporting information).

Figure 12:
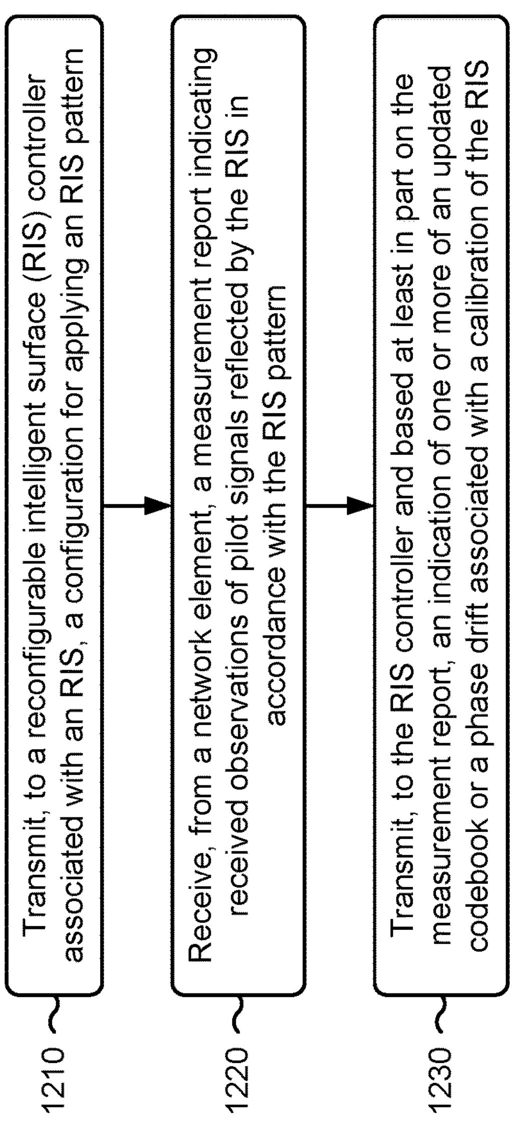
FIGS. 12-13 are diagrams illustrating example processes associated with RIS calibration, in accordance with the present disclosure.

FIG. 12 is a diagram illustrating an example process 1200 performed, for example, at a network node or an apparatus of a network node, in accordance with the present disclosure. Example process 1200 is an example where the apparatus or the network node (e.g., network node 110) performs operations associated with RIS calibration.

As shown in FIG. 12, in some aspects, process 1200 may include transmitting, to an RIS controller associated with an RIS, a configuration for applying an RIS pattern (block 1210). For example, the network node (e.g., using transmission component 1404 and/or communication manager 1406, depicted in FIG. 14) may transmit, to an RIS controller associated with an RIS, a configuration for applying an RIS pattern, as described above in connection with FIGS. 7A-7B, 8, 9A-9D, and 10A-10D, and/or 11.

As further shown in FIG. 12, in some aspects, process 1200 may include receiving, from a network element, a measurement report indicating received observations of pilot signals reflected by the RIS in accordance with the RIS pattern (block 1220). For example, the network node (e.g., using reception component 1402 and/or communication manager 1406, depicted in FIG. 14) may receive, from a network element, a measurement report indicating received observations of pilot signals reflected by the RIS in accordance with the RIS pattern, as described above in connection with FIGS. 7A-7B, 8, 9A-9D, and 10A-10D, and/or 11.

As further shown in FIG. 12, in some aspects, process 1200 may include transmitting, to the RIS controller and based at least in part on the measurement report, an indication of one or more of an updated codebook or a phase drift associated with a calibration of the RIS (block 1230). For example, the network node (e.g., using transmission component 1404 and/or communication manager 1406, depicted in FIG. 14) may transmit, to the RIS controller and based at least in part on the measurement report, an indication of one or more of an updated codebook or a phase drift associated with a calibration of the RIS, as described above in connection with FIGS. 7A-7B, 8, 9A-9D, and 10A-10D, and/or 11.

Process 1200 may include additional aspects, such as any single aspect or any combination of aspects described below and/or in connection with one or more other processes described elsewhere herein.

In a first aspect, the network element is a second network element, and process 1200 includes identifying a first network element to transmit the pilot signals, and identifying the second network element to receive the pilot signals reflected by the RIS and indicate the measurement report.

In a second aspect, alone or in combination with the first aspect, the RIS pattern is an applied sequential time-varying RIS pattern.

In a third aspect, alone or in combination with one or more of the first and second aspects, the network element is a TRP or a UE.

In a fourth aspect, alone or in combination with one or more of the first through third aspects, the RIS is not associated with a self-calibration capability.

In a fifth aspect, alone or in combination with one or more of the first through fourth aspects, process 1200 includes transmitting, to the network element, a configuration for one or more of time-frequency resources for transmitting the pilot signals, time-frequency resources for the received observations of pilot signals reflected by the RIS, or a transmit beam for the network element, or a receive beam for the network element.

In a sixth aspect, alone or in combination with one or more of the first through fifth aspects, the measurement report further indicates supporting information, and the supporting information indicates one or more of location information associated with the network element, or an angular direction of reference elements associated with the network element with respect to an RIS array reference element.

In a seventh aspect, alone or in combination with one or more of the first through sixth aspects, process 1200 includes receiving an indication of one or more of an RIS capability involving expected phase shifts imparted by each constituent element in response to a plurality of available control inputs that are to be applied on the constituent element, or a grouping configuration that is applicable on an RIS array, wherein the grouping configuration is a partition of RIS array element into groups such that a common control input is applied to a plurality of elements of a group.

In an eighth aspect, alone or in combination with one or more of the first through seventh aspects, the configuration indicates an additional training phase within a calibration sounding phase, wherein the additional training phase includes multiple symbol durations during which the network element transmits the pilot signals or measures the received observations, and the RIS is set to one of a switched off state, a soft-off state in which the RIS hops between randomized RIS patterns, or a configured state to reflect to a separate direction from another network element.

In a ninth aspect, alone or in combination with one or more of the first through eighth aspects, the configuration configures the RIS controller to apply the RIS pattern or a codeword from a calibration codebook, in accordance with a time schedule for applying the RIS pattern over a calibration phase excluding an additional training phase.

In a tenth aspect, alone or in combination with one or more of the first through ninth aspects, the received observations of pilot signals reflected by the RIS are associated with an SNR that satisfies a threshold, and the processing of received observations of pilot signals reflected by the RIS are associated with one or more of a normalization or a combining across observations corresponding to a same RIS pattern.

In an eleventh aspect, alone or in combination with one or more of the first through tenth aspects, process 1200 includes computing the phase drift based at least in part on the received observations of pilot signals reflected by the RIS and an effective channel.

In a twelfth aspect, alone or in combination with one or more of the first through eleventh aspects, process 1200 includes identifying the network element to transmit the pilot signals, and identifying the network element to receive the pilot signals reflected by the RIS and indicate the measurement report, wherein the network element is associated with a full-duplex operation.

In a thirteenth aspect, alone or in combination with one or more of the first through twelfth aspects, the pilot signals reflected by the RIS are associated with a reflected signal frequency or polarization translation.

In a fourteenth aspect, alone or in combination with one or more of the first through thirteenth aspects, the configuration indicates a periodicity and an offset for a time-varying RIS control.

In a fifteenth aspect, alone or in combination with one or more of the first through fourteenth aspects, process 1200 includes performing a phase drift estimation in a group-wise manner or in a block-wise manner by fitting one common phase drift per control input to each group or block of RIS elements, wherein RIS elements are portioned into multiple groups and a common control input is imposed on a plurality of elements within a group in accordance with the group-wise manner.

In a sixteenth aspect, alone or in combination with one or more of the first through fifteenth aspects, process 1200 includes configuring the network element to maintain no phase variation across successive transmissions or receptions during a sounding phase.

In a seventeenth aspect, alone or in combination with one or more of the first through sixteenth aspects, process 1200 includes identifying multiple pairs of network elements for the RIS, wherein each pair includes a first network element to transmit pilot signals and a second network element to receive the pilot signals after reflection from the RIS and compute measurement reports.

In an eighteenth aspect, alone or in combination with one or more of the first through seventeenth aspects, a calibration or a recalibration is triggered based at least in part on a signal quality satisfying a threshold, or information from the RIS.

In a nineteenth aspect, alone or in combination with one or more of the first through eighteenth aspects, the RIS controller is associated with multiple RIS arrays, and the calibration is associated with one or more RIS arrays of the multiple RIS arrays.

In a twentieth aspect, alone or in combination with one or more of the first through nineteenth aspects, the calibration is associated with a non-mobility.

In a twenty-first aspect, alone or in combination with one or more of the first through twentieth aspects, process 1200 includes receiving an indication that the network element is at least partially capable of determining the phase drift.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
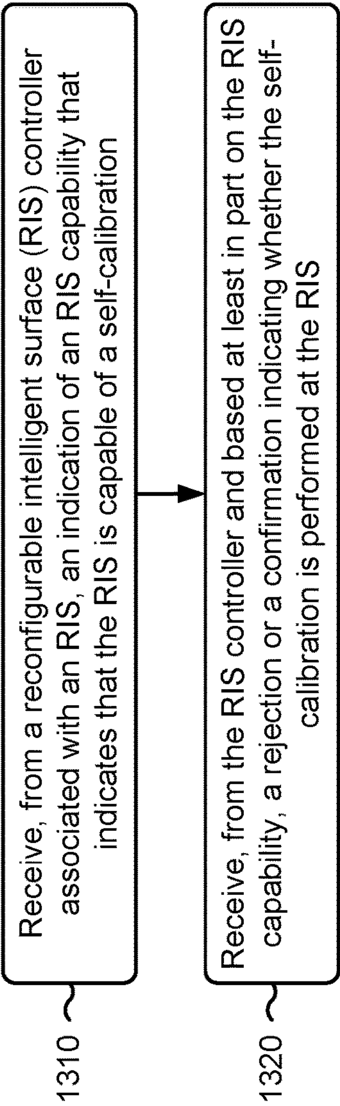
Figure 13:

FIG. 13 is a diagram illustrating an example process 1300 performed, for example, at a network node or an apparatus of a network node, in accordance with the present disclosure. Example process 1300 is an example where the apparatus or the network node (e.g., network node 110) performs operations associated with RIS calibration.

As shown in FIG. 13, in some aspects, process 1300 may include receiving, from an RIS controller associated with an RIS, an indication of an RIS capability that indicates that the RIS is capable of a self-calibration (block 1310). For example, the network node (e.g., using reception component 1402 and/or communication manager 1406, depicted in FIG. 14) may receive, from an RIS controller associated with an RIS, an indication of an RIS capability that indicates that the RIS is capable of a self-calibration, as described above in connection with FIGS. 7A-7B, 8, 9A-9D, and 10A-10D, and/or 11.

As further shown in FIG. 13, in some aspects, process 1300 may include receiving, from the RIS controller and based at least in part on the RIS capability, a rejection or a confirmation indicating whether the self-calibration is performed at the RIS (block 1320). For example, the network node (e.g., using reception component 1402 and/or communication manager 1406, depicted in FIG. 14) may receive, from the RIS controller and based at least in part on the RIS capability, a rejection or a confirmation indicating whether the self-calibration is performed at the RIS, as described above in connection with FIGS. 7A-7B, 8, 9A-9D, and 10A-10D, and/or 11.

Process 1300 may include additional aspects, such as any single aspect or any combination of aspects described below and/or in connection with one or more other processes described elsewhere herein.

In a first aspect, the self-calibration is associated with a self-determination of a phase drift associated with the RIS.

In a second aspect, alone or in combination with the first aspect, process 1300 includes receiving, from the RIS controller, a request for self-calibration that indicates a downtime for performing the self-calibration, performing, based at least in part on an input received from another network node receiving assistance from the RIS, an evaluation of the request, and transmitting, to the RIS controller and based at least in part on the evaluation, a rejection or an acceptance with a provisioned time window.

In a third aspect, alone or in combination with one or more of the first and second aspects, an RIS controller assessment for performing the self-calibration is based at least in part on the rejection or the acceptance with the provisioned time window.

In a fourth aspect, alone or in combination with one or more of the first through third aspects, process 1300 includes performing, based at least in part on an input received from another network node receiving assistance from the RIS, an evaluation of the RIS capability, and transmitting, to the RIS controller and based at least in part on the evaluation, a request for self-calibration with a provisioned time window.

In a fifth aspect, alone or in combination with one or more of the first through fourth aspects, an RIS controller assessment for performing the self-calibration is based at least in part on the request for self-calibration with the provisioned time window.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
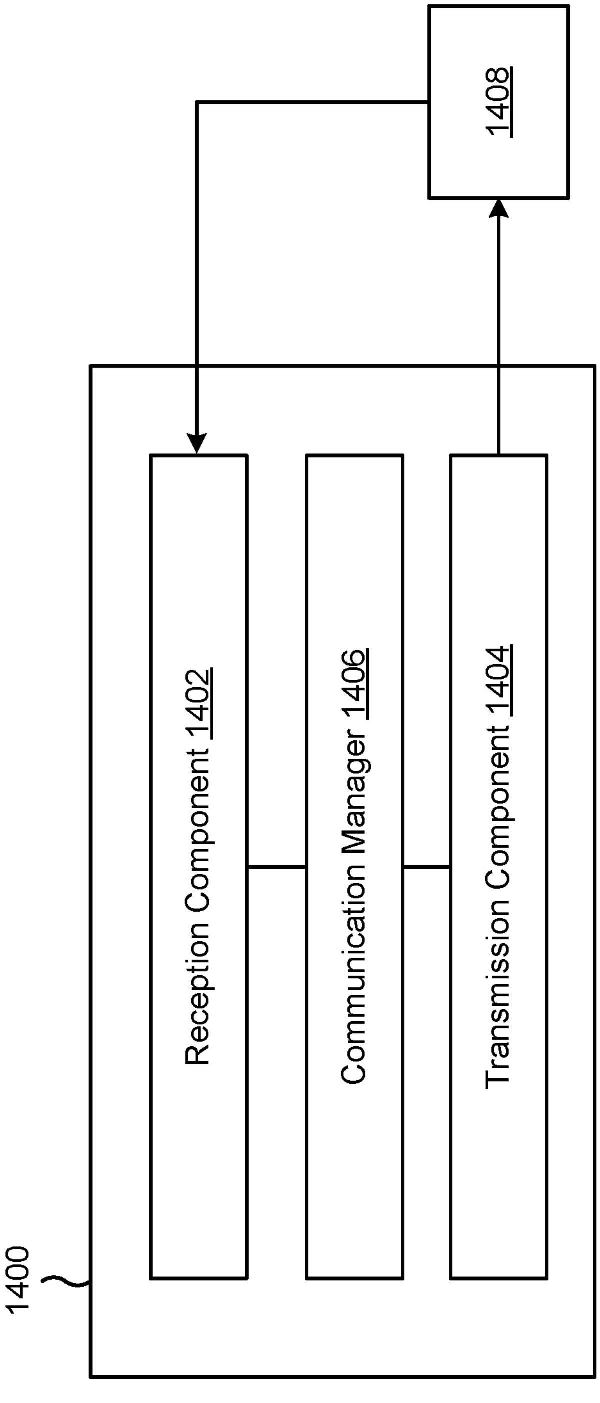
FIG. 14 is a diagram of an example apparatus for wireless communication, in accordance with the present disclosure.

FIG. 14 is a diagram of an example apparatus 1400 for wireless communication, in accordance with the present disclosure. The apparatus 1400 may be a network node, or a network node may include the apparatus 1400. In some aspects, the apparatus 1400 includes a reception component 1402, a transmission component 1404, and/or a communication manager 1406, which may be in communication with one another (for example, via one or more buses and/or one or more other components). In some aspects, the communication manager 1406 is the communication manager 150 described in connection with FIG. 1. As shown, the apparatus 1400 may communicate with another apparatus 1408, such as a UE or a network node (such as a CU, a DU, an RU, or a base station), using the reception component 1402 and the transmission component 1404.

In some aspects, the apparatus 1400 may be configured to perform one or more operations described herein in connection with FIGS. 7A-7B, 8, 9A-9D, and 10A-10D, and 11. Additionally, or alternatively, the apparatus 1400 may be configured to perform one or more processes described herein, such as process 1200 of FIG. 12, process 1300 of FIG. 13, or a combination thereof. In some aspects, the apparatus 1400 and/or one or more components shown in FIG. 14 may include one or more components of the network node described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1402 may receive communications, such as reference signals, control information, data communications, or a combination thereof, from the apparatus 1408. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, one or more modems, one or more demodulators, one or more MIMO detectors, one or more receive processors, one or more controllers/processors, one or more memories, or a combination thereof, of the network node described in connection with FIG. 2. In some aspects, the reception component 1402 and/or the transmission component 1404 may include or may be included in a network interface. The network interface may be configured to obtain and/or output signals for the apparatus 1400 via one or more communications links, such as a backhaul link, a midhaul link, and/or a fronthaul link.

The transmission component 1404 may transmit communications, such as reference signals, control information, data communications, or a combination thereof, to the apparatus 1408. In some aspects, one or more other components of the apparatus 1400 may generate communications and may provide the generated communications to the transmission component 1404 for transmission to the apparatus 1408. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1408. In some aspects, the transmission component 1404 may include one or more antennas, one or more modems, one or more modulators, one or more transmit MIMO processors, one or more transmit processors, one or more controllers/processors, one or more memories, or a combination thereof, of the network node described in connection with FIG. 2. In some aspects, the transmission component 1404 may be co-located with the reception component 1402 in one or more transceivers.

The communication manager 1406 may support operations of the reception component 1402 and/or the transmission component 1404. For example, the communication manager 1406 may receive information associated with configuring reception of communications by the reception component 1402 and/or transmission of communications by the transmission component 1404. Additionally, or alternatively, the communication manager 1406 may generate and/or provide control information to the reception component 1402 and/or the transmission component 1404 to control reception and/or transmission of communications.

The transmission component 1404 may transmit, to an RIS controller associated with an RIS, a configuration for applying an RIS pattern. The reception component 1402 may receive, from a network element, a measurement report indicating received observations of pilot signals reflected by the RIS in accordance with the RIS pattern. The transmission component 1404 may transmit, to the RIS controller and based at least in part on the measurement report, an indication of one or more of an updated codebook or a phase drift associated with a calibration of the RIS.

The transmission component 1404 may transmit, to the network element, a configuration for one or more of time-frequency resources for transmitting the pilot signals, time-frequency resources for the received observations of pilot signals reflected by the RIS, or a transmit beam for the network element; or a receive beam for the network element. The reception component 1402 may receive an indication of one or more of an RIS capability involving expected phase shifts imparted by each constituent element in response to a plurality of available control inputs that are to be applied on the constituent element; or a grouping configuration that is applicable on an RIS array, wherein the grouping configuration is a partition of RIS array element into groups such that a common control input is applied to a plurality of elements of a group.

The communication manager 1406 may compute the phase drift based at least in part on the received observations of pilot signals reflected by the RIS and an effective channel. The communication manager 1406 may identify the network element to transmit the pilot signals. The communication manager 1406 may identify the network element to receive the pilot signals reflected by the RIS and indicate the measurement report wherein the network element is associated with a full-duplex operation. The communication manager 1406 may perform a phase drift estimation in a group-wise manner or in a block-wise manner by fitting one common phase drift per control input to each group or block of RIS elements, wherein RIS elements are portioned into multiple groups and a common control input is imposed on a plurality of elements within a group in accordance with the group-wise manner.

The communication manager 1406 may configure the network element to maintain no phase variation across successive transmissions or receptions during a sounding phase. The communication manager 1406 may identify multiple pairs of network elements for the RIS, wherein each pair includes a first network element to transmit pilot signals and a second network element to receive the pilot signals after reflection from the RIS and compute measurement reports. The reception component 1402 may receive an indication that the network element is at least partially capable of determining the phase drift.

The reception component 1402 may receive, from an RIS controller associated with an RIS, an indication of an RIS capability that indicates that the RIS is capable of a self-calibration. The reception component 1402 may receive, from the RIS controller and based at least in part on the RIS capability, a rejection or a confirmation indicating whether the self-calibration is performed at the RIS.

The reception component 1402 may receive, from the RIS controller, a request for self-calibration that indicates a down-time for performing the self-calibration. The communication manager 1406 may perform, based at least in part on an input received from another network node receiving assistance from the RIS, an evaluation of the request. The transmission component 1404 may transmit, to the RIS controller and based at least in part on the evaluation, a rejection or an acceptance with a provisioned time window. The communication manager 1406 may perform, based at least in part on an input received from another network node receiving assistance from the RIS, an evaluation of the RIS capability. The transmission component 1404 may transmit, to the RIS controller and based at least in part on the evaluation, a request for self-calibration with a provisioned time window.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

The following provides an overview of some Aspects of the present disclosure:

Aspect 1: A method of wireless communication performed by a network node, comprising: transmitting, to a reconfigurable intelligent surface (RIS) controller associated with an RIS, a configuration for applying an RIS pattern; receiving, from a network element, a measurement report indicating received observations of pilot signals reflected by the RIS in accordance with the RIS pattern; and transmitting, to the RIS controller and based at least in part on the measurement report, an indication of one or more of an updated codebook or a phase drift associated with a calibration of the RIS.

Aspect 2: The method of Aspect 1, wherein the network element is a second network element, and further comprising: identifying a first network element to transmit the pilot signals; and identifying the second network element to receive the pilot signals reflected by the RIS and indicate the measurement report.

Aspect 3: The method of any of Aspects 1-2, wherein the RIS pattern is an applied sequential time-varying RIS pattern.

Aspect 4: The method of any of Aspects 1-3, wherein the network element is a transmission reception point (TRP) or a user equipment (UE).

Aspect 5: The method of any of Aspects 1-4, wherein the RIS is not associated with a self-calibration capability.

Aspect 6: The method of any of Aspects 1-5, further comprising: transmitting, to the network element, a configuration for one or more of: time-frequency resources for transmitting the pilot signals, time-frequency resources for the received observations of pilot signals reflected by the RIS, or a transmit beam for the network element; or a receive beam for the network element.

Aspect 7: The method of any of Aspects 1-6, wherein the measurement report further indicates supporting information, and the supporting information indicates one or more of: location information associated with the network element, or an angular direction of reference elements associated with the network element with respect to an RIS array reference element.

Aspect 8: The method of any of Aspects 1-7, further comprising: receiving an indication of one or more of: an RIS capability involving expected phase shifts imparted by each constituent element in response to a plurality of available control inputs that are to be applied on the constituent element; or a grouping configuration that is applicable on an RIS array, wherein the grouping configuration is a partition of RIS array element into groups such that a common control input is applied to a plurality of elements of a group.

Aspect 9: The method of any of Aspects 1-8, the configuration indicates an additional training phase within a calibration sounding phase, wherein the additional training phase includes multiple symbol durations during which the network element transmits the pilot signals or measures the received observations, and the RIS is set to one of: a switched off state, a soft-off state in which the RIS hops between randomized RIS patterns, or a configured state to reflect to a separate direction from another network element.

Aspect 10: The method of any of Aspects 1-9, wherein the configuration configures the RIS controller to apply the RIS pattern or a codeword from a calibration codebook, in accordance with a time schedule for applying the RIS pattern over a calibration phase excluding an additional training phase.

Aspect 11: The method of any of Aspects 1-10, wherein the received observations of pilot signals reflected by the RIS are associated with a signal-to-noise ratio (SNR) that satisfies a threshold, and processing of the received observations of pilot signals reflected by the RIS are associated with one or more of a normalization or a combining across observations corresponding to a same RIS pattern.

Aspect 12: The method of any of Aspects 1-11, further comprising: computing the phase drift based at least in part on the received observations of pilot signals reflected by the RIS and an effective channel.

Aspect 13: The method of any of Aspects 1-12, further comprising: identifying the network element to transmit the pilot signals; and identifying the network element to receive the pilot signals reflected by the RIS and indicate the measurement report, wherein the network element is associated with a full-duplex operation.

Aspect 14: The method of any of Aspects 1-13, wherein the pilot signals reflected by the RIS are associated with a reflected signal frequency or polarization translation.

Aspect 15: The method of any of Aspects 1-14, wherein the configuration indicates a periodicity and an offset for a time-varying RIS control.

Aspect 16: The method of any of Aspects 1-15, further comprising: performing a phase drift estimation in a group-wise manner or in a block-wise manner by fitting one common phase drift per control input to each group or block of RIS elements, wherein RIS elements are portioned into multiple groups and a common control input is imposed on a plurality of elements within a group in accordance with the group-wise manner.

Aspect 17: The method of any of Aspects 1-16, further comprising: configuring the network element to maintain no phase variation across successive transmissions or receptions during a sounding phase.

Aspect 18: The method of any of Aspects 1-17, further comprising: identifying multiple pairs of network elements for the RIS, wherein each pair includes a first network element to transmit pilot signals and a second network element to receive the pilot signals after reflection from the RIS and compute measurement reports.

Aspect 19: The method of any of Aspects 1-18, wherein a calibration or a recalibration is triggered based at least in part on: a signal quality satisfying a threshold, or sensor information from the RIS.

Aspect 20: The method of any of Aspects 1-19, wherein the RIS controller is associated with multiple RIS arrays, and the calibration is associated with one or more RIS arrays of the multiple RIS arrays.

Aspect 21: The method of any of Aspects 1-20, wherein the calibration is associated with a non-mobility.

Aspect 22: The method of any of Aspects 1-21, further comprising: receiving an indication that the network element is at least partially capable of determining the phase drift.

Aspect 23: A method of wireless communication performed by a network node, comprising: receiving, from a reconfigurable intelligent surface (RIS) controller associated with an RIS, an indication of an RIS capability that indicates that the RIS is capable of a self-calibration; and receiving, from the RIS controller and based at least in part on the RIS capability, a rejection or a confirmation indicating whether the self-calibration is performed at the RIS.

Aspect 24: The method of Aspect 23, wherein the self-calibration is associated with a self-determination of a phase drift associated with the RIS.

Aspect 25: The method of any of Aspects 23-24, further comprising: receiving, from the RIS controller, a request for self-calibration that indicates a down-time for performing the self-calibration; performing, based at least in part on an input received from another network node receiving assistance from the RIS, an evaluation of the request; and transmitting, to the RIS controller and based at least in part on the evaluation, a rejection or an acceptance with a provisioned time window.

Aspect 26: The method of Aspect 25, wherein an RIS controller assessment for performing the self-calibration is based at least in part on the rejection or the acceptance with the provisioned time window.

Aspect 27: The method of any of Aspects 23-26, further comprising: performing, based at least in part on an input received from another network node receiving assistance from the RIS, an evaluation of the RIS capability; and transmitting, to the RIS controller and based at least in part on the evaluation, a request for self-calibration with a provisioned time window.

Aspect 28: The method of Aspect 27, wherein an RIS controller assessment for performing the self-calibration is based at least in part on the request for self-calibration with the provisioned time window.

Aspect 29: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-28.

Aspect 30: An apparatus for wireless communication at a device, the apparatus comprising one or more memories and one or more processors coupled to the one or more memories, the one or more processors configured to cause the device to perform the method of one or more of Aspects 1-28.

Aspect 31: An apparatus for wireless communication, the apparatus comprising at least one means for performing the method of one or more of Aspects 1-28.

Aspect 32: A non-transitory computer-readable medium storing code for wireless communication, the code comprising instructions executable by one or more processors to perform the method of one or more of Aspects 1-28.

Aspect 33: A non-transitory computer-readable medium storing a set of instructions for wireless communication, the set of instructions comprising one or more instructions that, when executed by one or more processors of a device, cause the device to perform the method of one or more of Aspects 1-28.

Aspect 34: A device for wireless communication, the device comprising a processing system that includes one or more processors and one or more memories coupled with the one or more processors, the processing system configured to cause the device to perform the method of one or more of Aspects 1-28.

Aspect 35: An apparatus for wireless communication at a device, the apparatus comprising one or more memories and one or more processors coupled to the one or more memories, the one or more processors individually or collectively configured to cause the device to perform the method of one or more of Aspects 1-28.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a network node, comprising:

one or more memories; and one or more processors, coupled to the one or more memories, configured to cause the network node to:

identify a first network element to transmit pilot signals;

identify a second network element to receive the pilot signals reflected by a reconfigurable intelligent surface (RIS) and indicate a measurement report;

transmit, to a RIS controller associated with the RIS, a configuration for applying an RIS pattern;

receive, from the second network element, the measurement report indicating received observations of the pilot signals reflected by the RIS in accordance with the RIS pattern; and transmit, to the RIS controller and based at least in part on the measurement report, an indication of one or more of an updated codebook associated with a calibration of the RIS or a phase drift associated with the calibration of the RIS.

2. The apparatus of claim 1, wherein the network element is a transmission reception point (TRP) or a user equipment (UE).

3. The apparatus of claim 1, wherein the RIS is not associated with a self-calibration capability.

4. The apparatus of claim 1, wherein the one or more processors are further configured to cause the network node to:

transmit, to the network element, a configuration for one or more of:

time-frequency resources for transmitting the pilot signals, time-frequency resources for the received observations of pilot signals reflected by the RIS, a transmit beam for the network element, or a receive beam for the network element.

5. The apparatus of claim 1, wherein the one or more processors are further configured to cause the network node to:

receive an indication of one or more of:

an RIS capability involving expected phase shifts imparted by each constituent element in response to a plurality of available control inputs that are to be applied on the constituent element; or a grouping configuration that is applicable on an RIS array, wherein the grouping configuration is a partition of RIS array element into groups such that a common control input is applied to a plurality of elements of a group.

6. The apparatus of claim 1, wherein the configuration indicates an additional training phase within a calibration sounding phase, wherein the additional training phase includes multiple symbol durations during which the network element transmits the pilot signals or measures the received observations, and the RIS is set to one of:

a switched off state, a soft-off state in which the RIS hops between randomized RIS patterns, or a configured state to reflect to a separate direction from another network element.

7. The apparatus of claim 1, wherein the configuration configures the RIS controller to apply the RIS pattern or a codeword from a calibration codebook, in accordance with a time schedule for applying the RIS pattern over a calibration phase excluding an additional training phase.

8. The apparatus of claim 1, wherein the received observations of the pilot signals reflected by the RIS are associated with a signal-to-noise ratio (SNR) that satisfies a threshold, and processing of the received observations of the pilot signals reflected by the RIS are associated with one or more of a normalization or a combining across observations corresponding to a same RIS pattern.

9. The apparatus of claim 1, wherein the one or more processors are further configured to cause the network node to:

perform a phase drift estimation in a group-wise manner or in a block-wise manner by fitting one common phase drift per control input to each group or block of RIS elements, wherein RIS elements are portioned into multiple groups and a common control input is imposed on a plurality of elements within a group in accordance with the group-wise manner.

10. The apparatus of claim 1, wherein the one or more processors are further configured to cause the network node to:

configure the network element to maintain no phase variation across successive transmissions or receptions during a sounding phase.

11. The apparatus of claim 1, wherein the one or more processors are further configured to cause the network node to:

identify multiple pairs of network elements for the RIS, wherein each pair includes a first network element to transmit the pilot signals and a second network element to receive the pilot signals after reflection from the RIS and compute measurement reports.

12. The apparatus of claim 1, wherein the RIS controller is associated with multiple RIS arrays, and the calibration is associated with one or more RIS arrays of the multiple RIS arrays.

13. The apparatus of claim 1, wherein the calibration is associated with a non-mobility.

14. The apparatus of claim 1, wherein the one or more processors are further configured to cause the network node to:

receive an indication that the network element is at least partially capable of determining the phase drift.

15. An apparatus for wireless communication at a network node, comprising:

one or more memories; and one or more processors, coupled to the one or more memories, configured to cause the network node to:

transmit, to a reconfigurable intelligent surface (RIS) controller associated with an RIS, a configuration for applying an RIS pattern, wherein the RIS pattern is an applied sequential time-varying RIS pattern;

receive, from a network element, a measurement report indicating received observations of pilot signals reflected by the RIS in accordance with the RIS pattern; and transmit, to the RIS controller and based at least in part on the measurement report, an indication of one or more of an updated codebook associated with a calibration of the RIS or a phase drift associated with the calibration of the RIS.

16. An apparatus for wireless communication at a network node, comprising:

one or more memories; and one or more processors, coupled to the one or more memories, configured to cause the network node to:

transmit, to a reconfigurable intelligent surface (RIS) controller associated with an RIS, a configuration for applying an RIS pattern;

receive, from a network element, a measurement report indicating received observations of pilot signals reflected by the RIS in accordance with the RIS pattern; and transmit, to the RIS controller and based at least in part on the measurement report, an indication of one or more of an updated codebook associated with a calibration of the RIS or a phase drift associated with the calibration of the RIS;

wherein the measurement report further indicates supporting information, and the supporting information indicates one or more of: location information associated with the network element, or an angular direction of reference elements associated with the network element with respect to an RIS array reference element.

17. An apparatus for wireless communication at a network node, comprising:

one or more memories; and one or more processors, coupled to the one or more memories, configured to cause the network node to:

transmit, to a reconfigurable intelligent surface (RIS) controller associated with an RIS, a configuration for applying an RIS pattern;

receive, from a network element, a measurement report indicating received observations of pilot signals reflected by the RIS in accordance with the RIS pattern;

compute a phase drift based at least in part on the received observations of the pilot signals reflected by the RIS and an effective channel;

transmit, to the RIS controller and based at least in part on the measurement report, an indication of the computed phase drift.

18. An apparatus for wireless communication at a network node, comprising:

one or more memories; and one or more processors, coupled to the one or more memories, configured to cause the network node to:

identify a network element to transmit the pilot signals; and identify the network element to receive the pilot signals reflected by a reconfigurable intelligent surface (RIS) and indicate a measurement report, wherein the network element is associated with a full-duplex operation;

transmit, to an RIS controller associated with the RIS, a configuration for applying an RIS pattern;

receive, from the network element, the measurement report indicating received observations of the pilot signals reflected by the RIS in accordance with the RIS pattern;

transmit, to the RIS controller and based at least in part on the measurement report, an indication of one or more of an updated codebook associated with a calibration of the RIS or a phase drift associated with the calibration of the RIS.

19. The apparatus of claim 18, wherein the pilot signals reflected by the RIS are associated with a reflected signal frequency or polarization translation.

20. The apparatus of claim 19, wherein the configuration indicates a periodicity and an offset for a time-varying RIS control.

21. An apparatus for wireless communication at a network node, comprising:

one or more memories; and one or more processors, coupled to the one or more memories, configured to cause the network node to:

transmit, to a reconfigurable intelligent surface (RIS) controller associated with an RIS, a configuration for applying an RIS pattern;

receive, from a network element, a measurement report indicating received observations of pilot signals reflected by the RIS in accordance with the RIS pattern; and transmit, to the RIS controller and based at least in part on the measurement report, an indication of one or more of an updated codebook associated with a calibration of the RIS or a phase drift associated with the calibration of the RIS;

wherein a calibration or a recalibration is triggered based at least in part on:

a signal quality satisfying a threshold, or sensor information from the RIS.

22. A method of wireless communication performed by a network node, comprising:

identifying a first network element to transmit pilot signals;

identifying a second network element to receive the pilot signals reflected by a reconfigurable intelligent surface (RIS) and indicate a measurement report;

transmitting, to a RIS controller associated with the RIS, a configuration for applying an RIS pattern;

receiving, from the second network element, the measurement report indicating received observations of the pilot signals reflected by the RIS in accordance with the RIS pattern; and transmitting, to the RIS controller and based at least in part on the measurement report, an indication of one or more of an updated codebook associated with a calibration of the RIS or a phase drift associated with the calibration of the RIS.

* * * * *